United States Patent [19]
Uchihori et al.

[11] Patent Number: 6,055,646
[45] Date of Patent: *Apr. 25, 2000

[54] DISK ARRAY APPARATUS FOR MULTIMEDIA SERVER

[75] Inventors: Ikuo Uchihori, Tokyo; Tatsunori Kanai, Yokohama; Yoshiro Shimanouchi, Ichikawa, all of Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/960,220

[22] Filed: Oct. 29, 1997

[30] Foreign Application Priority Data

Oct. 30, 1996 [JP] Japan .................... 8-288335

[51] Int. Cl.$^7$ .................................. G06F 11/00
[52] U.S. Cl. ........................................... 714/6
[58] Field of Search ................ 714/6, 770, 772, 714/766; 711/5, 114; 371/40.14, 40.15, 40.17, 40.4

[56] References Cited

U.S. PATENT DOCUMENTS 5,418,925  5/1995  DeMoss et al. ................. 395/425
5,734,859  3/1998  Yorimitsu et al. ............... 395/440
5,835,940  11/1998 Yorimitsu et al. ............... 711/112
5,862,403  1/1999  Kanai et al. ..................... 395/826
5,875,475  2/1999  Kizu et al. ....................... 711/154

OTHER PUBLICATIONS

Tewari et al., "High Availability in Clustered Multimedia Servers", IEEE, pp. 645–654, Mar. 1996.
Patterson et al., "Introduction to Redundant Arrays of Inexpensive Disks (Raid)", IEEE, pp. 112–117, Mar. 1989.

*Primary Examiner*—Robert W. Beausoliel, Jr.
*Assistant Examiner*—Stephen C. Elmore
*Attorney, Agent, or Firm*—Finnegan, Henderson, Farabow, Garrett & Dunner, L.L.P.

[57] ABSTRACT

A plurality of disk array systems are realized in a single disk array apparatus, and double protection of disk arrays is achieved, whereby reliability is enhanced. Row-directional hard disk drives (HDD) connected to hard disk (HD) controllers constitute RAID4 groups. Column-directional HDDs constitute RAID3 groups. A disk region of each HDD is divided into a RAID3&4 region for storing large-volume data which is used repeatedly for a long time period, a RAID3 region for storing large-volume data which is used only for a predetermined time period, and a RAID4 region for storing small-volume data. The RAID3&4 region is protected by RAID3 and RAID4, the RAID3 region is protected by RAID3, and the RAID4 region is protected by RAID4.

11 Claims, 18 Drawing Sheets

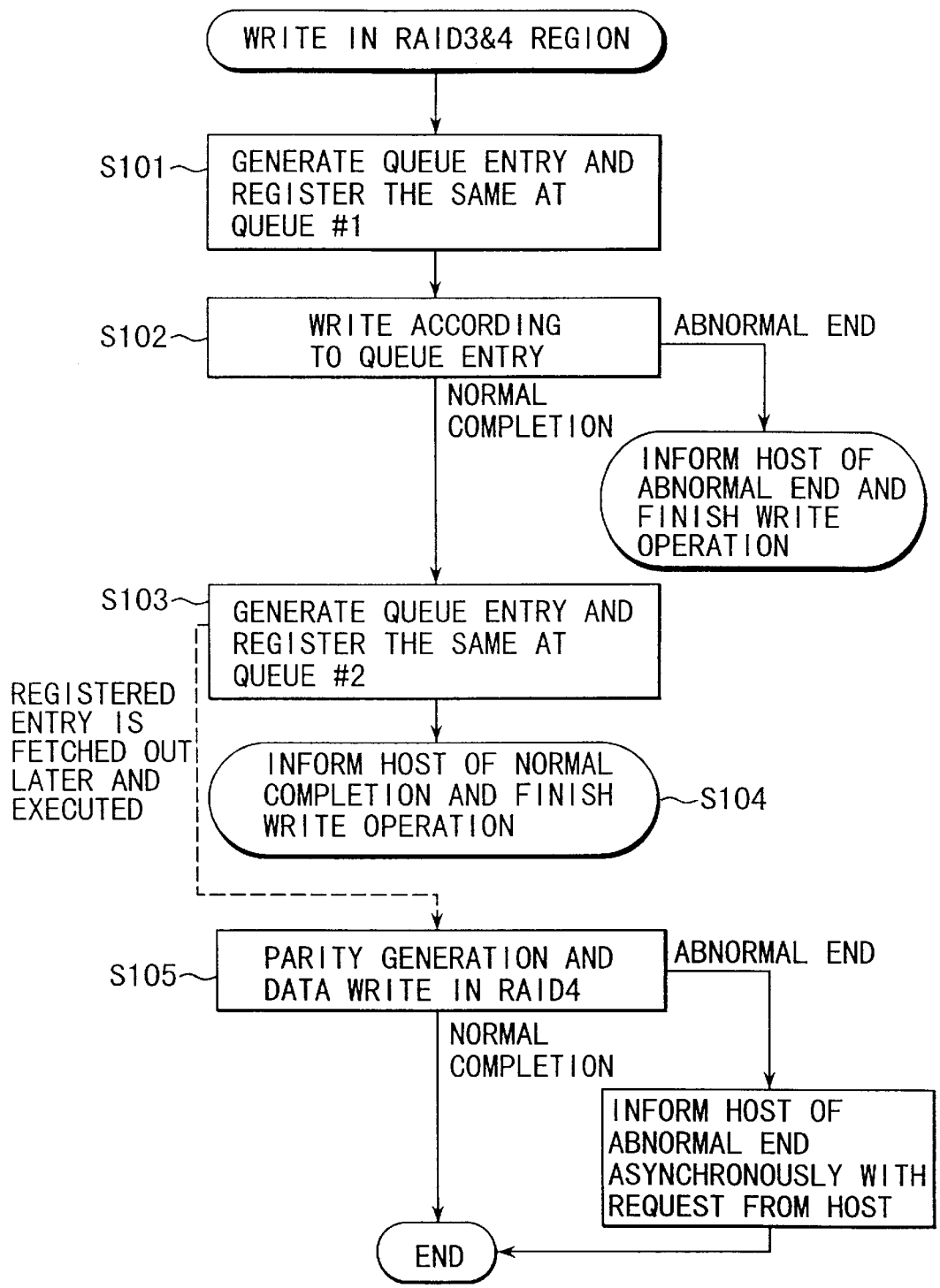
F I G. 16

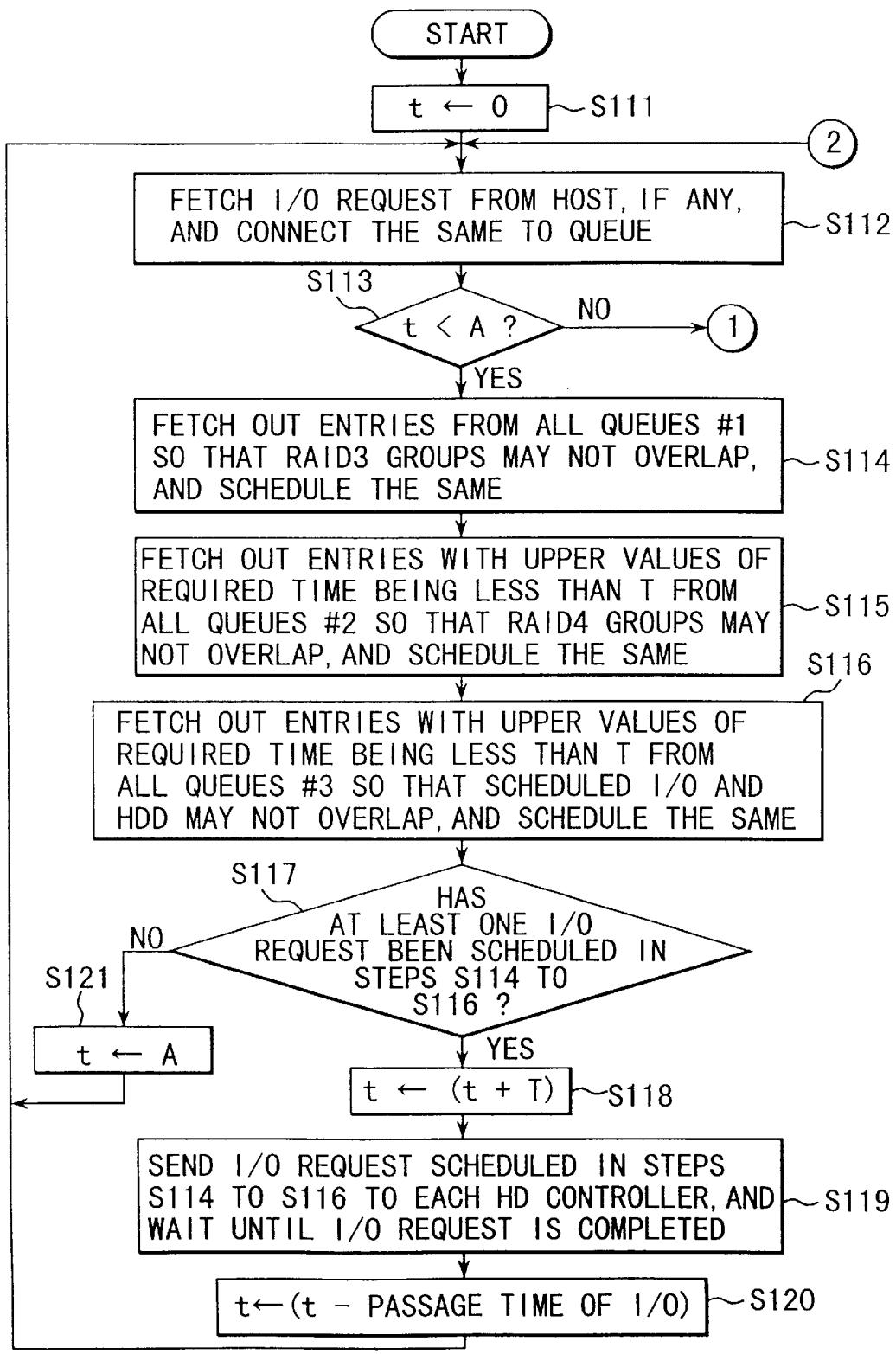
F I G. 17

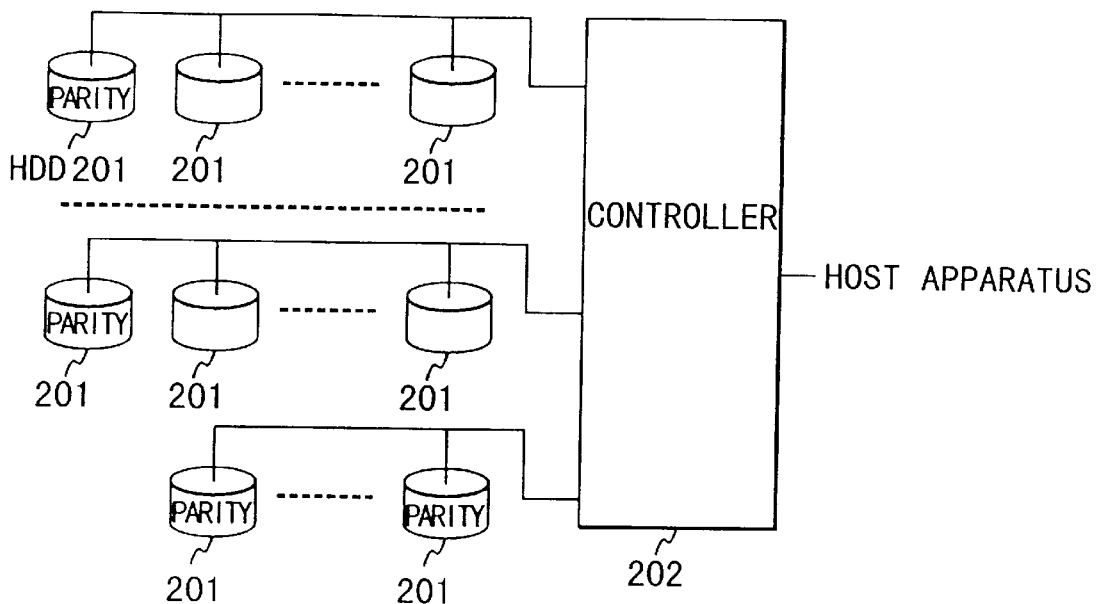
F I G. 2 0 (PRIOR ART)
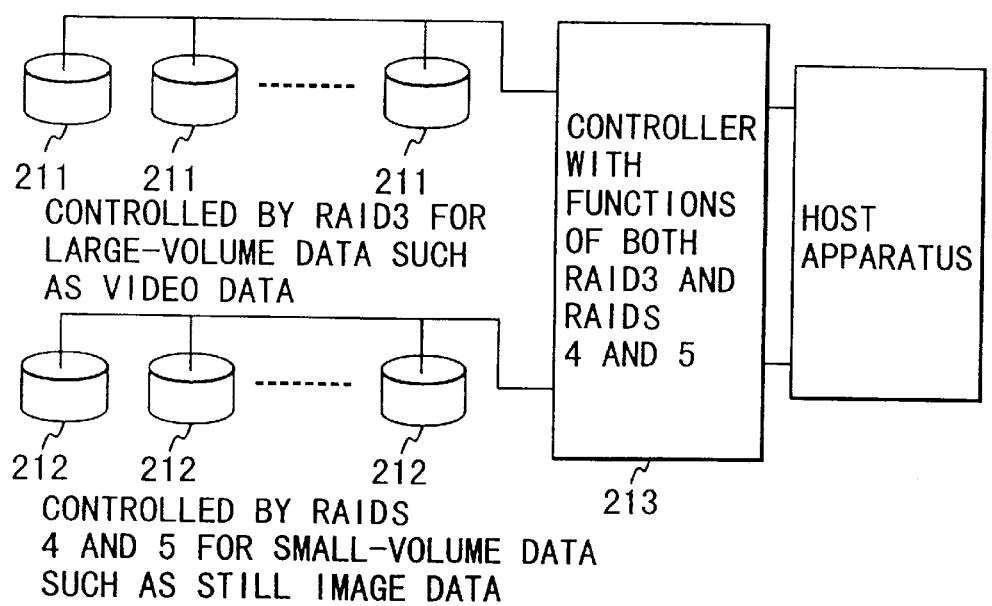
F I G. 2 1 (PRIOR ART)

DISK ARRAY APPARATUS FOR MULTIMEDIA SERVER

BACKGROUND OF THE INVENTION

The present invention relates to a disk array apparatus for a multimedia server, which apparatus comprises a plurality of disk drives.

Recently, a disk array apparatus comprising a plurality of disk drives has been developed, wherein data is stored dispersively in the disk drives (or storage media mounted in the disk drives), whereby parallel access is achieved and access speed is increased. This type of disk array apparatus is represented by a RAID (Redundant Arrays of Inexpensive Disks) apparatus adopting an architecture called "RAID." The RAID architecture is described in the following documents: D. Patterson, G. Gibson, and R. Katz, "A Case for Redundant Arrays of Inexpensive Disk (RAID)," ACM SIGMOD conference proceedings, Chicago, Ill., Jun. 1–3, 1988; and Randy H. Katz, Garth A. Gibson, and David A. Patterson, "Disk System Architecture for High Performance Computing," Report No. UCB/CSD 89/497 March 1989.

In the RAID architecture, as described above, data is stored dispersively in the disk drives to increase the access speed. In addition, error correction information (redundant data) called "parity" is stored in association with the dispersively stored data. Thereby, when a fault has occurred in any of the disk drives, data in the malfunctioning disk drive is recovered from the parity and the data in the other normal disk drives, thereby enhancing the reliability.

The above-described disk array apparatus can be used, for example, as a multimedia server for storing multimedia information. There are three demands for the multimedia server for storing multimedia information.

(1) Enhancement of Reliability

In order to store a great amount of data such as video data, an apparatus having less redundancy and higher reliability than a conventional RAID apparatus (disk array apparatus) is required.

For example, if a fault has occurred in a disk drive, if it is not protected by the RAID, the original data must be input once again. However, video data, which is great in volume, is often striped (i.e. a data stream is divided in predetermined units and dispersively arranged). Not only data in the malfunctioning but also other related data needs to be input once again. In this case, a great deal of time is needed to recover the data.

Such an undesirable situation must be avoided by increasing the scope of protection by the RAID and enhancing the reliability.

(2) Coexistence of Different Kinds of Data

The RAID architecture is generally divided into six levels of RAID 0 to RAID 5 (RAID levels 0 to 5). Of the six levels, RAID 3 to RAID 5 will now be briefly described.

In RAID 3, striping is performed in a relatively small unit (e.g. in a unit of byte) so that all disk drives can be accessed in parallel (simultaneously) for one I/O request. In addition, a parity of striped data is stored in a specially assigned disk drive (parity disk).

In RAID 4, striping is performed in a relatively large unit (e.g. a unit greater than a physical sector of disk) so that different disk drives are accessed independently for a plurality of I/O requests. In * addition, a parity of striped data is stored in a specially assigned disk drive.

RAID 5 is the same as RAID 4 except that striped data and parity are interleaved.

It is understood from the above that RAID 3 is suitable for storing a great amount of data, such as video data, which must be transferred at a fixed rate even when a fault has occurred in the disk drive.

On the other hand, RAID 4 or RAID 5 is suitable for storing a relatively small volume of data, such as still image data, which is required to have a high through-put.

However, when both video data and still image data are to be treated, there arises a problem if only one of RAID 3 and RAID 4 (5) is adopted.

Accordingly, it is required that both architectures (levels) of RAID 3 and RAID 4 (5) are adopted in the same RAID apparatus (disk array apparatus).

(3) Various Maintenance and Quality Required for Video Data

Video data can be used, for example, as (a) data which is used only for a predetermined time period, as in a monitoring system, and where necessary, backed up and overwritten, and (b) data which is stored for a long time period and used repeatedly. The kind of fault to be prevented is different between both data. In other words, the degree of redundancy and permissible overhead are different between both.

Video data is sent (transferred), for example, in two modes: (a) video data is sent directly to a user terminal with a small buffer memory and (b) video data is sent to some other server (disk array apparatus) and then to a user terminal repeatedly. In the respective cases, the required quality for data read-out and constancy are different.

Thus, various demands need to be satisfied in the same RAID apparatus (disk array apparatus).

In the prior art, disk array apparatuses as shown in FIGS. 20 and 21 have been proposed.

In the disk array apparatus shown in FIG. 20, a plurality of disk drives, e.g. hard disk drives (HDD) 201 are logically arranged in two dimension. A two-dimensional RAID system is realized under the control of a controller 202.

The disk array apparatus shown in FIG. 20 can achieve double RAID protection. This apparatus can meet the demand of the above item (1) but cannot the above item (2) or (3).

The disk array apparatus shown in FIG. 21 comprises a row of HDDs 211 controlled by RAID 3 and a row of HDDs 212 controlled by RAIDs 4 and 5. The row of HDDs 211 (group of RAID 3) and the row of HDDs 212 (group of RAIDs 4 and 5) are controlled by a controller 213 having functions of both RAID 3 and RAIDs 4 and 5.

The disk array apparatus shown in FIG. 21 has not been improved in the respect of reliability and fails to meet the demand of item (1). In addition, loads on the disks are not uniform and the efficiency is low. In a system wherein the ratio of large-volume data such as video data to small-volume data such as still image data varies, the efficiency of use of space within the disks deteriorates. That is, the demand of item (2) cannot be met. Moreover, the demand of item (3) for flexibility (or versatility) cannot be satisfied.

BRIEF SUMMARY OF THE INVENTION

As has been described above, the conventional disk array apparatuses cannot meet the demands of the above items (1) to (3).

The present invention has been made in consideration of the above circumstances, and its object is to provide a disk array apparatus for a multimedia server, which apparatus comprises two-dimensional disk arrays having different functions in directions of logical arrangement of disk drives, whereby a plurality of disk array systems can be achieved in the same disk drive, double disk array protection can be ensured, the reliability is enhanced, different kinds of data can coexist, and optimal access is performed in accordance with the kind and purpose of data.

According to the present invention, there is provided a disk array apparatus for a multimedia server, the apparatus comprising: a group of disk drives logically arranged in two dimensions represented by a first direction and a second direction, a disk region of each disk drive being divided for use into a first region (hereinafter referred to as "RAID3&4 region") for storing first large-volume data, a second region ("RAID3 region") for storing second large-volume data different from the first large-volume data and a third region ("RAID4 region") for storing small-volume data, each of lines of the disk drives arranged in the first direction constituting a first disk array group ("RAID3 group"), all disk drives of the first disk array group being accessed in parallel, each of lines of the disk drives arranged in the second direction constituting a second disk array group ("RAID4 group"), all disk drives of the second disk array group being accessed in parallel; disk controllers provided for the respective lines of the disk drives arranged in the second direction (row direction), for access-controlling the disk drives of the associated lines; control means for controlling each disk controller according to a request from a host apparatus; and input/output means ("RAID architecture") for performing data input/output between itself and each disk controller under control of the control means, the input/output means being capable of performing error correction ("recovery by RAID3") on the basis of data read out from each disk controller and generating first-type parity data ("parity data of RAID3") serving as error correction information of write data supplied from the host apparatus, wherein divided data of the first large-volume data or the parity data of RAID3 (first-type parity data) serving as the error correction information of this divided data is located on the RAID3&4 region (first region) of each disk drive of the RAID3 group (first disk array group), divided data of the second large-volume data or the first-type parity data ("parity data of RAID3") serving as the error correction information of this divided data is located on the RAID3 region (second region) of each disk drive of the first disk array group, divided data of the small-volume data or second-type parity data ("parity data of RAID4") serving as the error correction information of this divided data is located on the RAID4 region (third region) of each disk drive of the RAID4 group (second disk array group), and parity data of RAID4 (second-type parity data) or error correction information of the divided data located on the RAID3&4 region (first region) of each of the other disk drives in the same second disk array group is located on the RAID3&4 region (first region) of each of the disk drives of the RAID4 group (second disk array group).

In the above disk array apparatus, the RAID3&4 region storing the first large-volume data is protected by both RAID3 and RAID4. The RAID3&4 region, therefore, is suitable for storing data requiring high resistance to damage, e.g. ordinary video data which is used repeatedly for a long time. The RAID3 region storing the second volume data is protected by the RAID3. Although the RAID3 region requires less fault tolerance than the RAID3&4 region storing the first large-volume data, the former requires less overhead. For example, the RAID3&4 region is suitable for storing video data used only for a predetermined period, as in a monitoring system. On the other hand, small-volume data such as still image data, the through-put of which is regarded as important, may be stored in the RAID4 region. Thus, RAID4 becomes applicable, and the through-put increases.

According to the present invention, in order to increase the fault tolerance at the time of reading out the first large-volume data in the above disk array apparatus, when the control means is requested by the host apparatus to read out data from the RAID3&4 region (first region), the control means instructs each disk controller to read out data from the RAID3&4 region (first region) of each disk drive of the RAID3 group (first disk array group) or a target first disk array group. In case of a read-out error, the control means reads out data from the corresponding RAID3&4 regions (first regions) of the other disk drives of the RAID 4 group (second disk array group), to which the disk drive associated with the read-out error belongs, and performs a read-out control in a mode with recovery by a first system ("read-out with recovery by RAID4") for performing error correction based on the read-out data. When only one of the disk controllers cannot perform error correction, the control means instructs the input/output means to perform error correction ("recovery by RAID3") on the basis of data read out from each of the other disk controllers.

According to this disk array apparatus, even if there are two or more disk drives, in which read errors have occurred in the read-out by RAID3, the data associated with the errors can be recovered if read-out by RAID4 is performed and error correction using parity data of RAID4 is made. However, if there is only one disk drive in which a read error has occurred in the read by RAID3, the data associated with the error can be recovered by the input/output means (RAID architecture) based on RAID3. Thus, the time for recovery by the associated disk controller is wasted.

In order to avoid such waste of time, when the control means is requested by the host apparatus to read out data from the RAID3&4 region (first region), the control means instructs each disk controller to perform a data read-out in a mode without recovery by a second system ("read-out in a mode without recovery by RAID4") for performing only data read-out from the RAID3&4 region (first region) of each disk drive of the RAID3 group (first disk array group) which is the target disk array group. When a read error has occurred in only one of the disk controllers, the control means instructs the input/output means (RAID architecture) to perform error correction (recovery by RAID3) on the basis of data read out from each of the other disk controllers. When read errors have occurred in two or more of the disk controllers, the control means instructs the disk controllers with the read errors to read out data from the RAID3&4 regions (first regions) of the associated disk drives of the corresponding RAID4 group (second disk array group). In case of a read error, the control means performs a data read-out in a mode with recovery by the second system ("read-out in a mode with recovery by RAID4") for reading out data from the corresponding RAID3&4 region (first region) of each of the other disk drives of the RAID4 group (second disk array group) and performing error correction based on the read-out data, and when error correction is unfeasible in only one of the disk controllers, the control means instructs the input/output means to perform error correction based on data read out from the other disk controllers.

In addition, even when the control means is requested by the host apparatus to read out data from the RAID3&4 region (first region), if constancy is more important than quality (e.g. read-out data is directly sent to the user), read-out by RAID3 is performed as in the case of a data-read request from the RAID3 region, unlike data read-out for transmission to some other server. Specifically, the control means instructs each disk controller to read out data from the first region of each disk drive of the RAID3 group (first disk array group) or the target group. When a read error has occurred in only one of the disk controllers, the control means instructs the input/output means to perform error correction on the basis of data read out from each of the other disk controllers.

According to the present invention, data read from the RAID3&4 region doubly protected by RAID3 and RAID4 can be performed by one of the two read-out methods in accordance with the purpose of data read-out.

In this invention, when the control means is requested by the host apparatus to read out data from the RAID4 region, the control means performs a scheduling process, wherein the control means instructs the disk controller corresponding to the disk drive designated by the host apparatus to perform a data read-out ("read-out in a mode without recovery by RAID4") from the RAID4 region; when a read error has occurred, the control means instructs the disk controller to read out data from the corresponding RAID4 regions of the disk drives of the RAID4 group to which the designated disk drive belongs and to perform error correction based on the read-out data (data read-out in a recovery mode by RAID4); and when error correction is impossible due to the read error, the control means instructs the disk controller to perform performing a data read-out in a mode with recovery by the second system for performing data read-out from the designated disk drive of the RAID4 group to which the designated disk drive belongs and error correction (read-out in a mode with recovery by RAID4) based on data read out from the RAID4 region of each of the other disk drives of the RAID4 group to which the designated disk drive belongs at the time of the read error.

As has been described above, the number of opportunities for reading small-volume data from the RAID4 region can be increased by controlling the operated disk drive in multi-stages, without influencing the scheduling of read-out of large-volume data.

In this invention, the RAID3&4 region and RAID3 region for storing large-volume data are arranged on the disk region radially outward of the RAID4 region for storing small-volume data.

Since the small-volume data is located on the inner peripheral portion of the disk region and the large-volume data is located on the outer peripheral region which is radially outward of the inner peripheral portion, the large-volume data is located on the region where data amount per track is greater than on the inner peripheral portion. Thus, the transmission performance of large-volume data can be enhanced.

In this invention, when the control means is requested by the host apparatus to write data in the RAID3&4 region, the control means instructs the input/output means to generate the first-type parity (parity data of RAID3) of write data supplied from the host apparatus and instructs each disk controller to write divided data of the write data or the generated parity data into the RAID3&4 region of each disk drive of a target one of the RAID3 groups, and the control means instructs the input/output means to generate the second-type parity data (parity data of RAID4) on the basis of data of the corresponding RAID3&4 regions of the disk drives of each of the RAID4 groups, to which the associated disk drives belong, and write the generated second-type parity data into the RAID3&4 regions of the corresponding disk drives.

As has been described above, in this invention, two kinds of parity data, i.e. parity data of RAID3 and parity data of RAID4, is generated in association with the data written in the RAID3&4 region, and the data in the RAID3&4 region is doubly protected by RAID3 and RAID4.

In the present invention, in the data write in the RAID3&4 region, a great deal of time is required in the generation/write of parity for RAID4. In order to solve this problem, the control means has a first queue (queue #1) for each of the RAID3 groups, the first queue representing I/O requests for the RAID3&4 region and I/O requests for the RAID3 region, and a second queue (queue #2) for each of the RAID4 groups, the second queue representing read-out requests for the RAID3&4 region in the mode with recovery by RAID4 and parity generation/write requests by RAID4. When the control means is requested by the host apparatus to write data in the RAID3&4 region, the control means instructs the input/output means to generate the parity data of RAID3 of write data supplied from the host apparatus., and connects, to the first queue corresponding to the RAID3 group, I/O requests for instructing each disk controller to write divided data of the write data or the generated parity data into the RAID3&4 region of each disk drive of the RAID3 group which is the target disk array group. If data write represented by the I/O request connected to the first queue has normally been completed, the control means connects, to the second queue corresponding to the RAID4 group, a parity generation/write request by the RAID4 for writing in the RAID3&4 region of the corresponding disk drive the parity data of RAID4 generated based on the data of the corresponding RAID3&4 region of each disk drive of RAID4 group, for each of the RAID4 groups to which the disk drives of the RAID3 group belong, and informs the host apparatus of normal completion of data write. Thus, the parity generation/write request by RAID4 is executed after the host apparatus is informed of the normal completion.

In the present invention, the apparent performance of data write in the RAID3&4 region is enhanced. If the parity generation/write request by RAID4 is executed and the operation ends with abnormality, it should suffice if the control means informs the host apparatus of the abnormal end, asynchronously with the request from the host apparatus.

The parity generation/write request by RAID4 is connected to the second queue at such a side thereof that it is executed earlier than any of the read-out requests in the mode with recovery by RAID4. Thereby, reading of erroneous data can be prevented.

Besides, in the present invention, the control means further includes a third queue (queue #3) for each RAID4 group, the third queue representing I/O requests for the RAID4. The control means further comprises first time storage means (T-register) for storing a first time (T) calculated by adding an allowance time to a time required for executing the requests connected to the first queue; second time storage means (A-register) for storing a second time (A) greater than the first time and than an upper limit value of a time required for executing each request connected to the second queue and the third queue; and third time storage means (t-register) for storing a third time (t) calculated by accumulating a difference between the first time and a time required to actually execute the request. When a transfer length of the input/output request for the RAID3&4 region or RAID3 region, which is to be connected to the first queue, is greater than a predetermined length, the input/output request is divided into a plurality of input/output requests each having a transfer length less than the predetermined length, and the divided input/output requests are connected to the first queue. An upper limit value of a necessary request execution time, which is needed in the state in which there is no interference between requests, is set in each of the requests connected to the second queue and the third queue. The input/output requests are normally scheduled such that the requests connected to the first queue have top priority and the first disk array groups do not overlap. Those of the requests connected to the second and third queues, in which the upper limit values less than the first time (T) are set, are scheduled. When at least one of the requests (hereinafter referred to as "first schedule" in this case) has been scheduled, the control means stores in the third storage means a new third time (t) obtained by adding the first time (T) to the third time (t), and controls the execution of the scheduled request, and stores in the third time storage means a new third time (t) obtained by subtracting a passage time until completion of the execution from the third time (t). When none of the requests has been scheduled, the control means stores the second time (A) in the third time storage means as the third time (t). When the third time (t) becomes greater than the second time (A), the control means schedules only those of the requests which are connected to the second queue and third queue (hereinafter "second schedule") and executes the scheduled request. When none of the requests has been scheduled after the execution of the request was completed, the control means immediately stores initial value "0" in the third time storage means.

In the present invention, if the request corresponding to the first schedule is executed, it is ensured that the passage time for the execution of the request is less than T (first time). As a result of updating of t (third time) performed after the execution of the request, the time t increases. Each time this process is repeated, the time t increases and at last the value of t becomes t≧A. Then, the second schedule is performed for only the requests connected to the second queue and third queue. In this case, the requests, whose upper limit value of the time needed for executing the request is greater than T (T being less than A), are to be scheduled. If the request scheduled by the second schedule is executed, the value t is updated to the initial value "0". At this time, the first schedule is executed, and the second schedule is not performed successively.

Accordingly, in this invention, if a new request is registered when the first queue is empty, the request is scheduled within a time period of (A+T). If a new request is registered in the state in which, e.g. a p-number of requests are connected to the first queue, a maximum time needed for completion of scheduling of the top request is (A+T) and the upper limit of time needed for requests of p-number of entries is pT. Thus, the newly registered request is scheduled within a time period of (A+(p+1)T). In other words, the access time for the request in the first queue is ensured.

In this invention, the I/O request can be executed at a rate of once in time T if the first queue is prevented from becoming empty by the control of the host apparatus. That is, the rate of I/O in the first queue is ensured. However, in the case where an I/O request in the mode with recovery has been issued, if it is reconnected to the second queue, the issuance of information on the completion of I/O request is delayed.

In the present invention, even when requests are connected to the first queue, there are opportunities at which requests are scheduled on the second and third queues.

As has been described above, a predetermined rate of I/O of large-volume data such as video data is ensured, and if there is an allowance, I/O of small-volume data such as still image data can be executed in parallel.

According to the present embodiment, the following advantages can be obtained.

(1) As regards the I/O (input/output) on the RAID3&4 region 311 and RAID3 region 312, the issuance and completion of I/O requests is monitored and the condition of queues is estimated from the host apparatus side. Thus, a worst execution start time point of an I/O request, which is now to be issued, can be estimated irrespective of the condition of I/O on the RAID4 region 313 (including the condition of I/O requests to be issued).

(2) As regards the I/O on the RAID3&4 region 311 and RAID3 region 312, I/O requests are issued from the host apparatus sufficiently in advance. Thereby, the rate of I/O requests of HDDs of the associated RAID3 group can be ensured. However, in the case of data read from RAID3&4 region 311, if an I/O request in the mode with recovery by RAID4 has been issued, the issuance of information on the completion of the I/O request may be delayed. The completion of each I/O request does not occur at regular intervals, but it may occur earlier.

(3) Even when I/O requests on the RAID3&4 region 311 and RAID3 region 312 are issued frequently, the I/O on the RAID region 313 is always effected at a non-busy time. In this case, a control from the host apparatus needs to be performed to reduce as much as possible the upper limit value of time required for I/O (e.g. by reducing the upper limit of required data transfer length). It is also possible to reduce the value A by issuing control commands from the host apparatus and thus increase the frequency of I/O requests. However, since the above advantage (1) of reducing the estimated time is brought about, the value A needs to be set carefully on the host apparatus side.

As has been described above, the present embodiment can provide a disk array apparatus wherein a predetermined I/O rate of large-volume data such as video data is ensured and, if there is an allowance, I/O of small-volume data such as still image data can be executed in parallel.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 16 is a flow chart illustrating an improved process of writing data in RAID3&4 region as illustrated in FIG. 5;

FIG. 17 is a part of a flow chart illustrating a process of scheduling I/O requests in the embodiment;

FIG. 20 is a block diagram showing the structure of a conventional disk array apparatus; and FIG. 21 is a block diagram showing the structure of a conventional disk array apparatus.

DETAILED DESCRIPTION OF THE INVENTION

An embodiment of the present invention will now be described with reference to the accompanying drawings.

Figure 1:
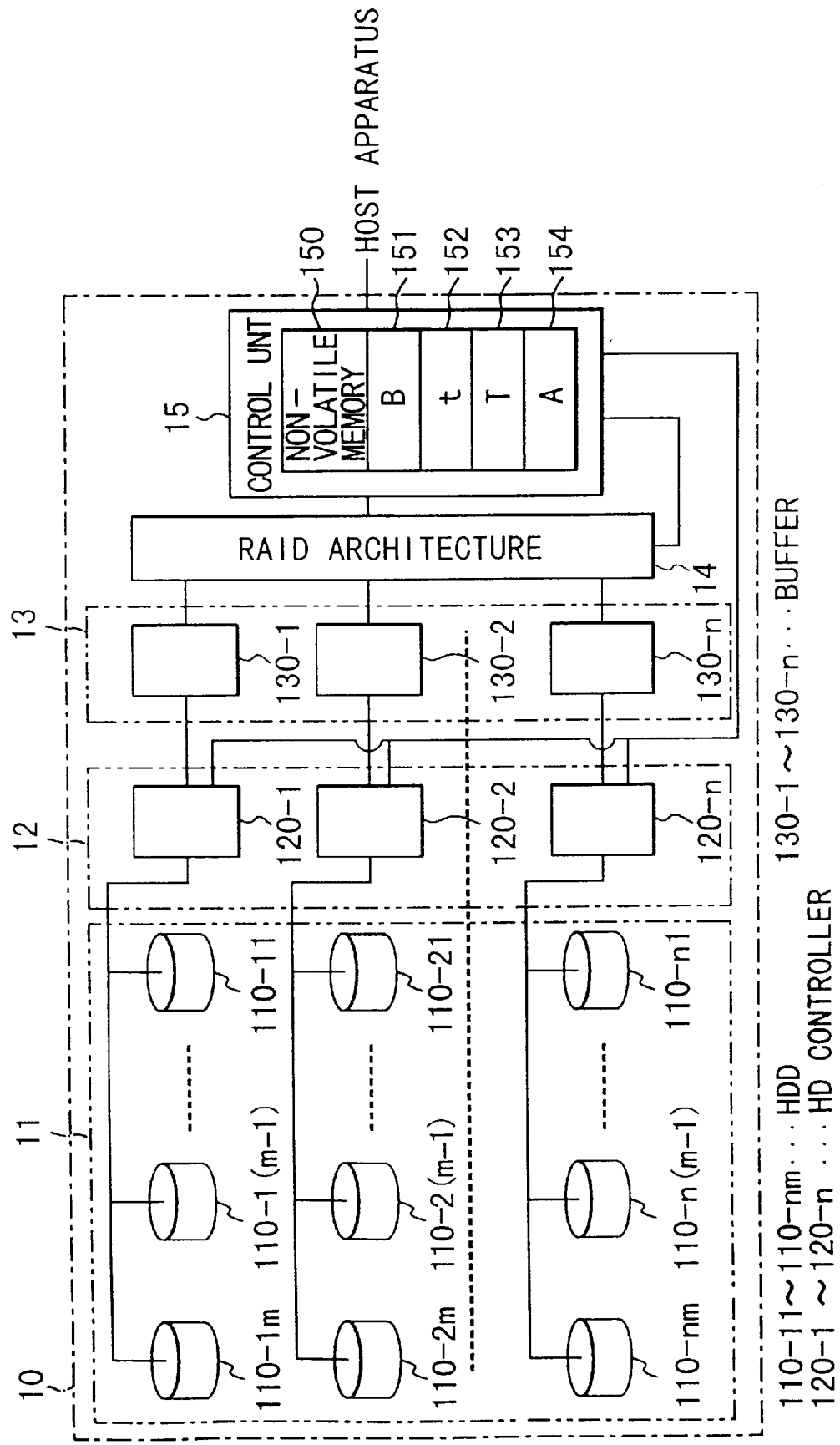
FIG. 1 is a block diagram showing a structure of a disk array apparatus for a multimedia server, according to an embodiment of the present t invention.

FIG. 1 is a block diagram showing the structure of a disk array apparatus for a multimedia server, according to an embodiment of the present invention.

Figure 10:
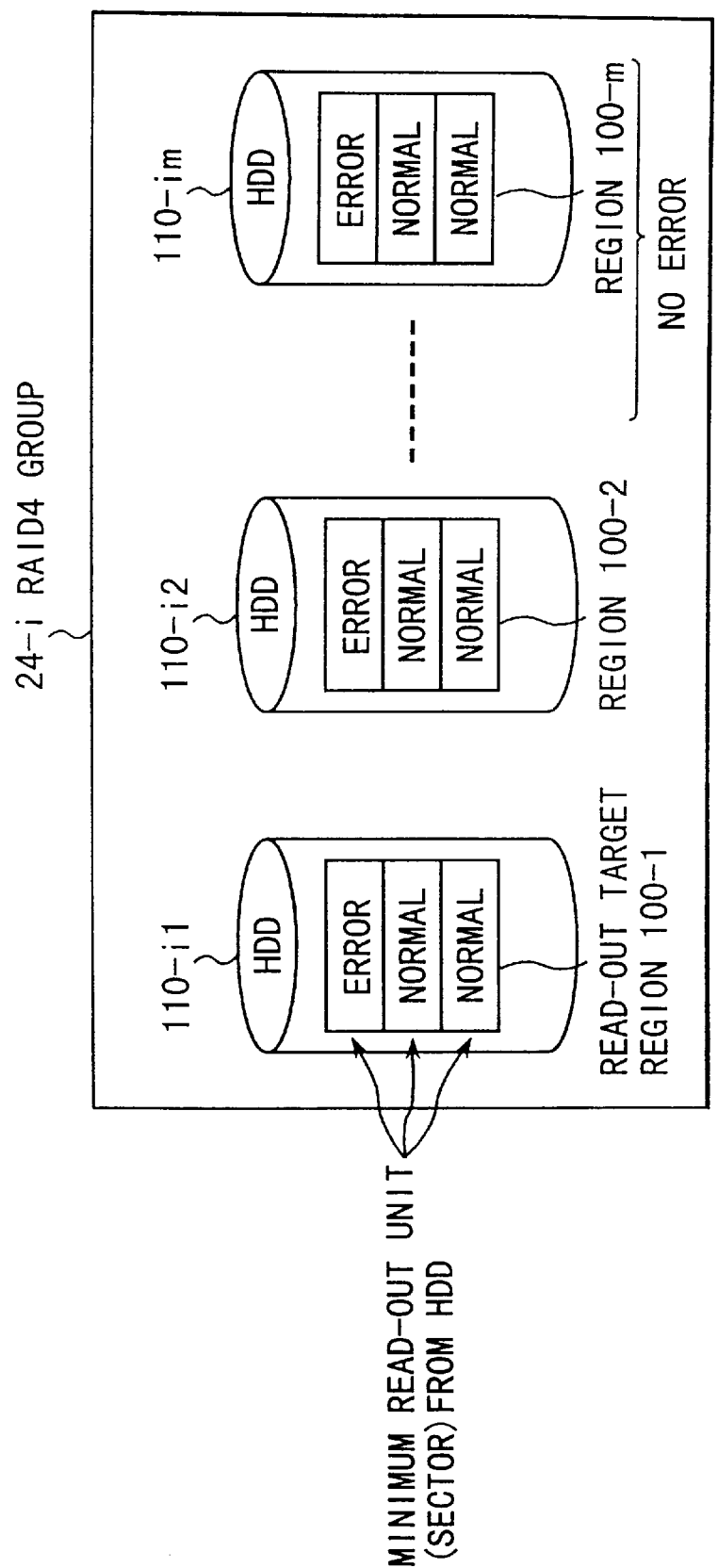
FIG. 10 is a view for explaining a difference between a mode with recovery by RAID4 and a recovery mode by RAID4 of three modes prepared to improve data read-out from RAID4 region, as illustrated in FIG. 8.

A disk array apparatus 10 shown in FIG. 10 is designed to achieve both architectures of RAID 3 and RAID 4 in the same apparatus. The disk array apparatus 10 comprises a disk drive group, e.g. hard disk drive (HDD) group 11; a HD controller section 12 comprising HD (hard disk) controllers 120-1 to 120-n; a buffer section 13 comprising buffers 130-1 to 130-n; a RAID architecture 14; and a control unit 15.

The HDD group 11 comprises m×n HDDs, i.e. HDDs 110-11 to 110-1m, 110-21 to 110-2m, . . . , 110-n1 to 110-nm, which have a logical two-dimensional arrangement of m×n.

Figure 2:
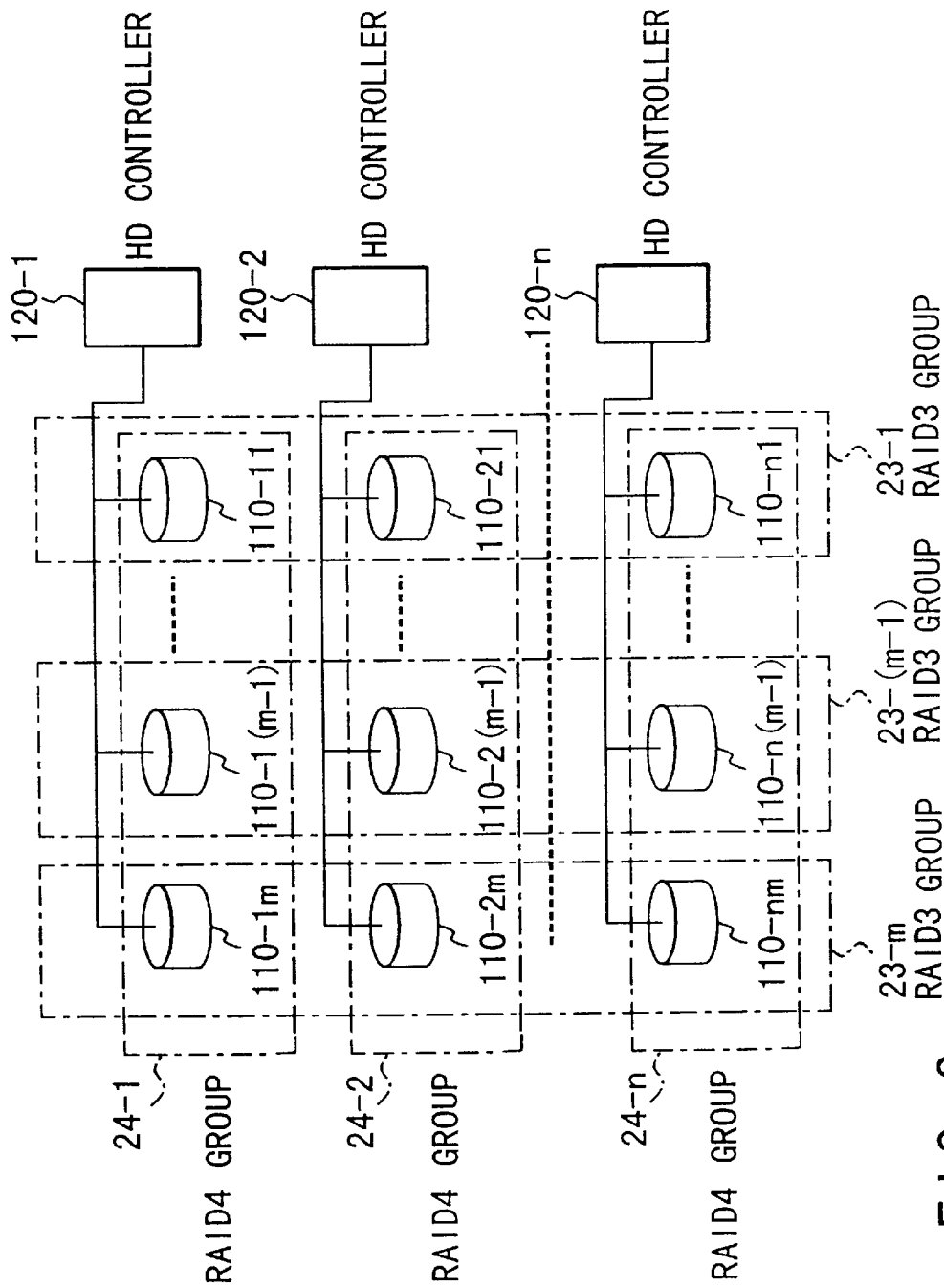
FIG. 2 shows an example of the structure of RAID3 and RAID4 groups in an HDD group 11 in FIG. 1.
Figure 3:
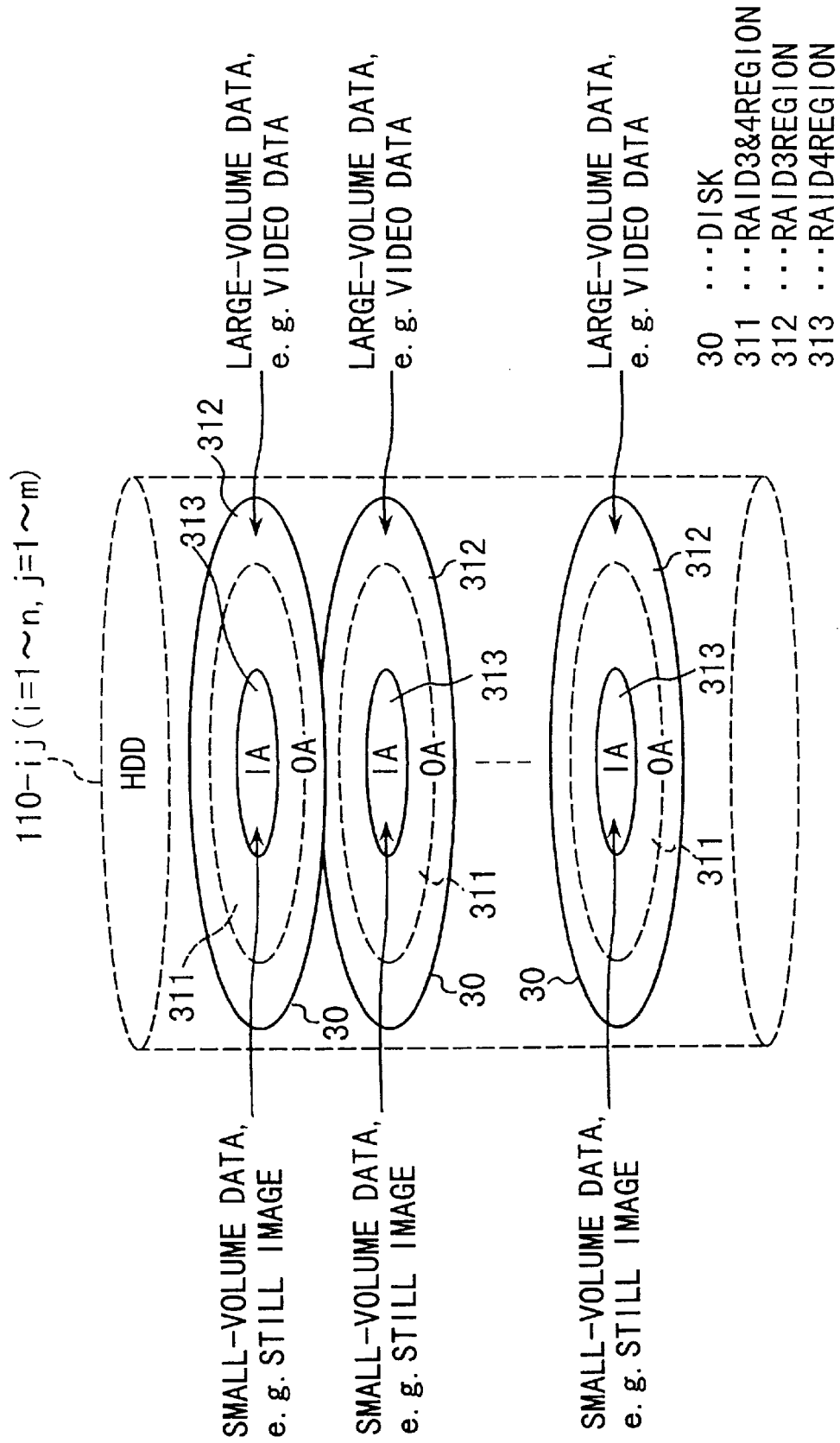
FIG. 3 shows an example of division of regions of disks mounted in each HDD 100-ij (i=1 to n; j=1 to m)

The HDDs 110-11 to 110-1m, 110-21 to 110-2m, . . . , 110-n1 to 110-nm of the HDD group 11, which are arranged in the x-direction (row direction), are connected to the HDD controllers 120-1, 120-2, . . . , 120-n. As is shown in FIG. 2, the HDDs 110-11 to 110-1m, . . . , 110-n1 to 110-nm (specifically, RAID 4 regions 313 or inner peripheral regions of disks 30 mounted in these HDDs as shown in FIG. 3) constitute groups 24-1, . . . , 24-n of RAID 4. The HDDs 110-11 to 110-n1, . . . , 110-1m to 110-nm of the HDD group 11 (specifically, RAIDs 3 & 4 regions and RAID 3 regions 312, i.e. outer peripheral OA regions of disks 30 as shown in FIG. 3), which are arranged in the y-direction (column direction), constitute groups 23-1, . . . , 23-m of RAID 3, as shown in FIG. 2.

In this embodiment, one RAID 4 group 24-i is connected to one HD controller 120-i (i=1 to n). However, each HDD controller 120-i (i=1 to n) may be connected to a plurality of groups.

The HDDs 110-1m to 110-nm constituting RAID 3 group 23-m (specifically, RAID 4 regions 313, i.e. inner peripheral regions 1A, and RAID3&4 region 311 constituting part of outer peripheral regions OA of disks 30 mounted in these HDDs, as shown in FIG. 3) are used for storing parity data of RAID 4 groups 24-1 to 24-n. The HDDs 110-n1 to 110-nm constituting RAID 4 group 24-n (specifically, RAID3&4 region 311 and RAID 3 regions 312 constituting outer peripheral regions OA of disks 30 mounted in these HDDs, as shown in FIG. 3) are used for storing parity data of RAID 3 groups 23-1 to 23-n.

The HD controllers 120-1 to 120-n of HD controller section 12 control, as RAID 4 controllers, the HDDs of RAID 4 groups 24-1 to 24-n connected to themselves, upon instructions from the control unit 15. The HD controllers 120-1 to 120-n can also function as controllers without RAID functions, upon instructions from the control unit 15.

The buffers 130-1 to 130-n of buffer section 13 are used to temporarily store data input/output to/from the HD controllers 120-1 to 120-n.

The RAID architecture 14 is constructed such that it can, upon instructions from the control unit 15, execute the functions of the RAID 3 or directly input/output the data in the buffers 130-1 to 130-n of buffer section 13.

The control unit 15 controls the entire apparatus through the HD controller section 12 and RAID architecture 14 upon instructions from a host apparatus (not shown). The control unit 15 includes a nonvolatile memory 150 for storing boundary information, etc. to be described later.

In this embodiment, the regions of each HDD 110-ij (i=1 to n; j=1 to m) of the HDD group 11, and more specifically, the regions of each disk 30 mounted, as shown in FIG. 3, in the HDD 110-ij, are divided into three kinds to be used.

(a) Region 311 Protected by Both RAIDs 3 and 4

The region 311 (hereinafter referred to as "RAIDs 3 & 4") is used for storing ordinary video data. When data is written in the region 311, parity bits of both RAIDs 3 and 4 are generated.

There are two modes for reading out data from the region 311.

First, when video data is transmitted directly to the user, recovery by RAID 4 is not performed in order to maintain constancy and reduce over-head of the system rather than to maintain the quality (hereinafter this mode is called "mode without recovery").

Second, when video data is transmitted to some other server (disk array apparatus), recovery by RAID 4 is performed in order to maintain the quality (hereinafter this mode is called "recovery mode").

In any case, recovery by RAID 3 is performed.

(b) Region 312 Protected by RAID 3 Alone

This region (hereinafter referred to as "RAID 3") 312 is used for storing video data which is stored in a short time period as in the case of application to a monitoring system. When data is written in the region 312, the parity of RAID 3 alone is generated. When data is read out from the region 312, recovery by RAID 3 is performed.

(c) Region 313 Protected by RAID 4 Alone

This region (hereinafter referred to as "RAID 4") 313 is used for storing small-volume data represented by still image data. When data is written in the region 313, the parity of RAID 4 alone is generated. When data is read out from the region 313, recovery by RAID 4 is performed.

In this embodiment, each of disks 30 (in each HDD 110-ij) is divided into an inner peripheral region IA and an outer peripheral region OA and these regions are separately managed. The inner peripheral region IA is assigned to the RAID4 region 313 and used for storing small-volume data such as still image data. Thus, the inner peripheral region IA is controlled by RAID4. On the other hand, the outer peripheral region OA is assigned to the RAID3&4 region 311 and RAID3 region 312 and is used for storing large-amount data. Thus, the outer peripheral region OA is controlled by RAID3 or RAID 3&4.

In general, since the amount of data per track is greater on the outer peripheral region than the inner peripheral region of disk 30, the data read-out (transfer) speed is higher on the outer peripheral region. Accordingly, if large-volume data such as video data is located on the outer peripheral region OA, as mentioned above, the transmission performance of video data, etc. can be enhanced. On the other hand, small-volume data such as still image data is located on the inner peripheral region IA, as mentioned above. Since the small-volume data (as compared to large-volume data) has a large ratio of seek time, i.e. rotation wait time, to the I/O time (i.e. time needed for data input/output), the degree of deterioration in performance is low even if the transfer time increases.

By virtue of the above structure, the performance of the entire system increases.

Although in FIG. 3 the RAID3 region 312 is located outside the RAID3&4 region 311, the positional relationship may be reversed.

Information on a boundary region between the inner peripheral region IA and outer peripheral region OA is common in all disks 30 in the HDD 110-ij (i=1 to n, j=1 to m). This information is stored in a boundary information region (hereinafter referred to as "B-register") 151 defined in the nonvolatile memory 150 provided within the control unit 15 shown in FIG. 1. The boundary information in the B-register 151 in the nonvolatile memory 150 can be rewritten by a command from the host apparatus.

The operations of the present embodiment will now be described in the following order: 1) data read-out in the recovery mode from RAID3&4 region 311, 2) data write in RAID3&4 region 311, 3) data read-out from RAID3 region 312 or data read-out in the mode without recovery from RAID3&4 region 311, 4) data write in RAID3 region 312, 5) data read-out from RAID4 region 313, and 6) data write in RAID4 region 313.

(1) Data Read-out in the Recovery Mode from RAID3&4 Region 311

The data read-out in the recovery mode from RAID3&4 region 311 will first be described with reference to the flowchart of FIG. 4.

In the case where an instruction from the host apparatus is one for reading out large-volume data such as ordinary video data, which is stored for a long time and used repeatedly, from RAID3&4 region 311 in order to send the data to some other server (disk array apparatus), the control unit 15 sends a read command for data read-out with a recovery function by RAID4 to the HD controllers 120-1 to 120-n within the HD controller section 12 (step S1). The read command to each HD controller 120-i (i=1 to n) includes information on HDD 110-ij (j=1 to m) and information on a disk region (i.e. a seek address to a top position of the region and information on transfer data length)in the HDD 110-ij.

The HD controller 120-i performs data read-out from the HDD 110-ij, as requested by the read command from the control unit 15 (step S2), and determines whether the data has been normally read (step S3).

If there is no error, the HD controller 120-i stores the data read out in step S2 into the buffer 130-i within the buffer section 13, and informs the control unit 15 of the normal completion of data read-out (step S4).

If there is an error, the HD controller 120-i executes recovery by RAID4 (step S5). Specifically, the HD controller 120-i performs the same read-out operation as in step S1 for the HDD 110-i1 to 110-im excluding the HDD 110-ij within the RAID4 group 24-i. If all data has been normally read, the recovery is determined to be feasible. By finding an exclusive OR of the read-out data, the data of HDD 110-ij is recovered.

When the recovery by RAID4 has been successively performed (step S6), the HD controller 120-i stores the recovered data into the buffer 130-i within the buffer section 13 and informs the control unit 15 of the normal completion of data read-out (step S7). On the other hand, if data has not successively been read out from any one of the HDDs, the HD controller 120-i determines that the recovery by RAID4 is not feasible and informs the control unit 15 of the read error (unfeasibility of recovery) (step S8).

The control unit 15 monitors the output of error information (information on unfeasibility of recovery) from each HD controller 120-i (step S9). If the number of HD controllers 120-i which have output the error information is zero, it is determined that the data, which the control unit 15 requested the HD controllers 120-1 to 120-n to acquire, is stored in the buffers 130-1 to 130-n of buffer section 13, and the control goes to step S10. In step S10, the control unit 15 requests the RAID architecture 14 to start the operation of RAID3, and data of buffers 130-1 to 130-(n−1) is synthesized and the synthesized data is output to the host apparatus.

If the number of HD controllers 120-i which have output the error information is one, the control unit 15 performs a control in step S11. In step S11, the control unit 15 requests the RAID architecture 14 to start the operation of RAID3. Thus, the data to be read out by the HD controller 120-i which has output the error information is recovered in the buffer 130-i from the data in buffers 130-1 to 130-n corresponding to the HD controllers 120-1 to 120-n excluding the sole HD controller 120-i which has output the error information. The data in the buffers 130-1 to 130(n−1) is synthesized and the synthesized data is output to the host apparatus.

If the number of HD controllers 120-i which have output the error information is two or more, the control unit 15 informs the host apparatus to the effect that even if the RAID3 function of RAID architecture 14 is activated, data recovery is unfeasible. Thus, the control is finished with the error (step S12).

(2) Write in RAID3&4 Region 311

Data write in RAID3&4 region 311 will now be described with reference to the flow chart of FIG. 5.

In the case where an instruction from the host apparatus is one for writing large-volume data such as ordinary video data, which is stored for a long time and used repeatedly, in RAID3&4 region 311, the control unit 15 instructs the RAID architecture 14 to start the function of RAID3. Thereby, the RAID mechanism 14 stripes the data (write data) from the host apparatus by RAID3, and generates associated parity data. The striped data (divided data) and parity data are stored in associated buffers 130-1 to 130-n in the buffer section 13 (step S21).

The control unit 15 instructs the HD controllers 120-1 to 120-n of HD controller section 12 to write the data stored in buffers 130-1 to 130-n into target HDDs 110-1i to 110-nj of the RAID3 group 23-j (j=1 to m−1) while generating parity data for the RAID4 (step S22).

Then, each HD controller 120-i (i=1 to n) writes the data stored in buffers 130-i into target HDD 110-ij of the RAID3 group 23-j (i.e. target HDD 110-ij of RAID4 group 24-i) while generating parity data for the RAID4. In addition, the generated parity data is written in the HDD 110-im in RAID4 group 24-i (step S23). The parity data for RAID4 is generated as follows.

At first, the HD controller 120-i reads out data from those regions of HDDs 110-i1 to 110-i(m−1) in RAID4 group 24-i, which correspond to the data write region of the target HDD 110-ij. Then, the HD controller 120-i updates the data read out from the target HDD 110-ij, on the basis of the data in the buffer 130-i, and an exclusive OR of the data read out from the HDDs 110-i1 to 110-i(m−1), including the updated data, is found to generate parity data. The HD controller 120-i then writes the updated data in the target HD 110-ij in RAID4 group 24-i and writes the generated parity data in the region (corresponding to the data write region of target HDD) in the HD 110-im of RAID4 group 24-i.

(3) Data Read-out from RAID3 Region 312 or Data Read-out in the Mode without Recovery from RAID3&4 Region 311

Figure 6:
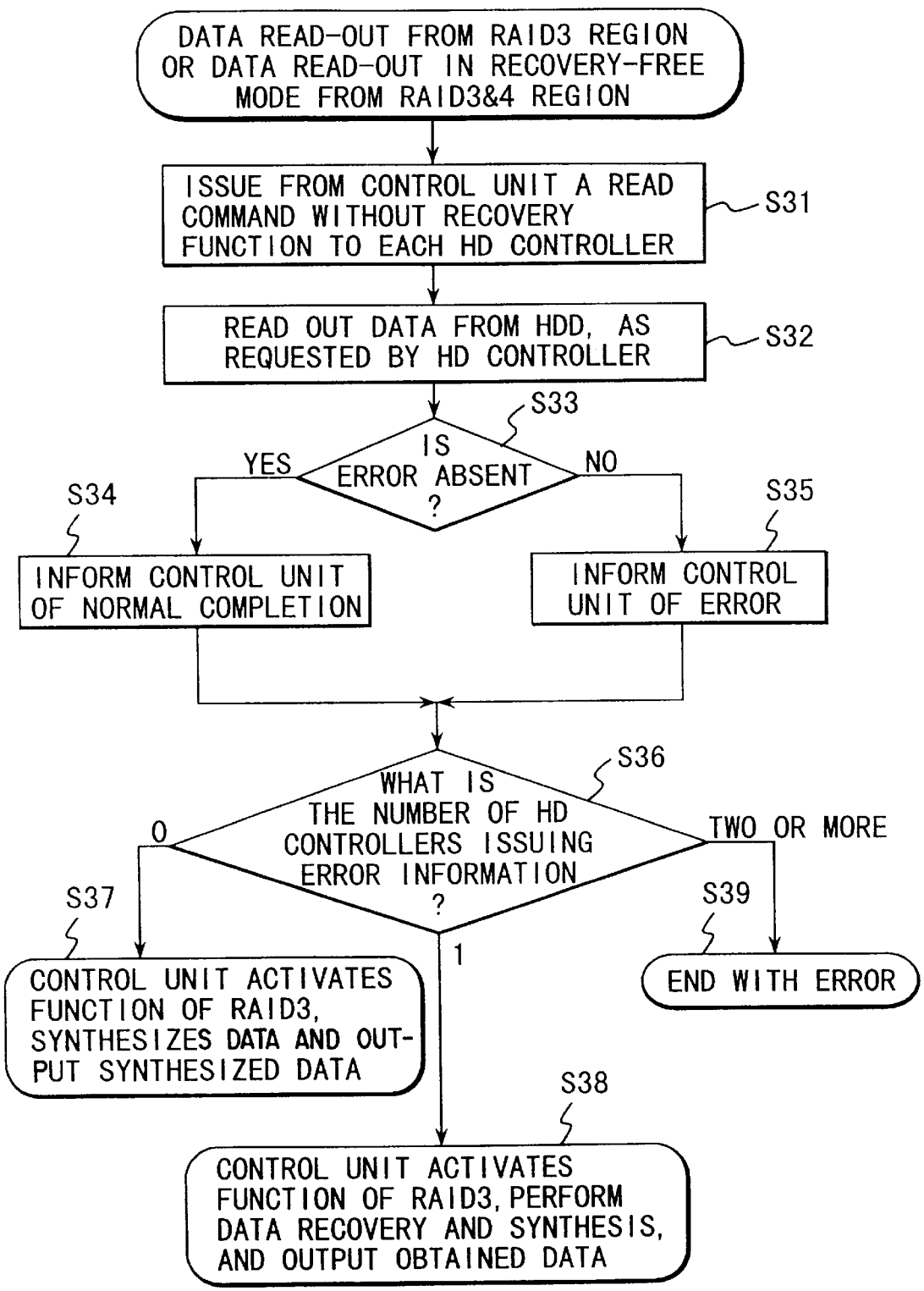
FIG. 6 is a flow chart illustrating data read-out from RAID3 and data read-out in a mode without recovery from RAID3&4 region in the embodiment.

The data read-out from RAID3 region 312 or data read-out in the mode without recovery from RAID3&4 region 311 will now be described with reference to the flow chart of FIG. 6.

In the case where an instruction from the host apparatus is one for reading out large-volume data such as video data applied to a monitoring system, which is stored for a short time period, from RAID3 region 312, or one for reading out large-volume data such as ordinary video data, which is stored for a long time and used repeatedly, from RAID3&4 region 311, the control unit 15 sends a read command for data read-out without a recovery function by RAID4 to the HD controllers 120-1 to 120-n within the HD controller section 12 (step S31).

The HD controller 120-i (i=1 to n) performs data read-out from the HDD 110-ij (j=1 to m), as requested by the read command from the control unit 15 (step S32), and determines whether the data has been normally read (step S33).

If there is no error, the HD controller 120-i stores the data read out in step S32 into the buffer 130-i within the buffer section 13, and informs the control unit 15 of the normal completion of data read-out (step S34). If there is an error, the HD controller 120-i does not execute recovery and informs the control unit 15 of the read error (S35).

The control unit 15 monitors the output of error information from each HD controller 120-i (step S36). If the number of HD controllers 120-i which have output the error information is zero, it is determined that the data, which the control unit 15 requested the HD controllers 120-1 to 120-n to acquire, is stored in the buffers 130-1 to 130-n of buffer section 13, and the control goes to step S37. In step S37, the control unit 15 requests the RAID architecture 14 to start the operation of RAID3, and data of buffers 130-1 to 130-(n−1) is synthesized and the synthesized data is output to the host apparatus.

If the number of HD controllers 120-i which have output the error information is one, the control unit 15 performs a control in step S38. In step S38, the control unit 15 requests the RAID architecture 14 to start the operation of RAID3. Thus, the data to be read out by the HD controller 120-i which has output the error information is recovered in the buffer 130-i from the data in buffers 130-1 to 130-n corresponding to the HD controllers 120-1 to 120-n excluding the sole HD controller 120-i which has output the error information. The data in the buffers 130-1 to 130(n−1) is synthesized and the synthesized data is output to the host apparatus.

If the number of HD controllers 120-i which have output the error information is two or more, the control unit 15 informs the host apparatus to the effect that even if the RAID3 function of RAID architecture 14 is activated, data recovery is unfeasible. Thus, the control is finished with the error (step S39).

(4) Write in RAID3 Region 312

Figure 7:
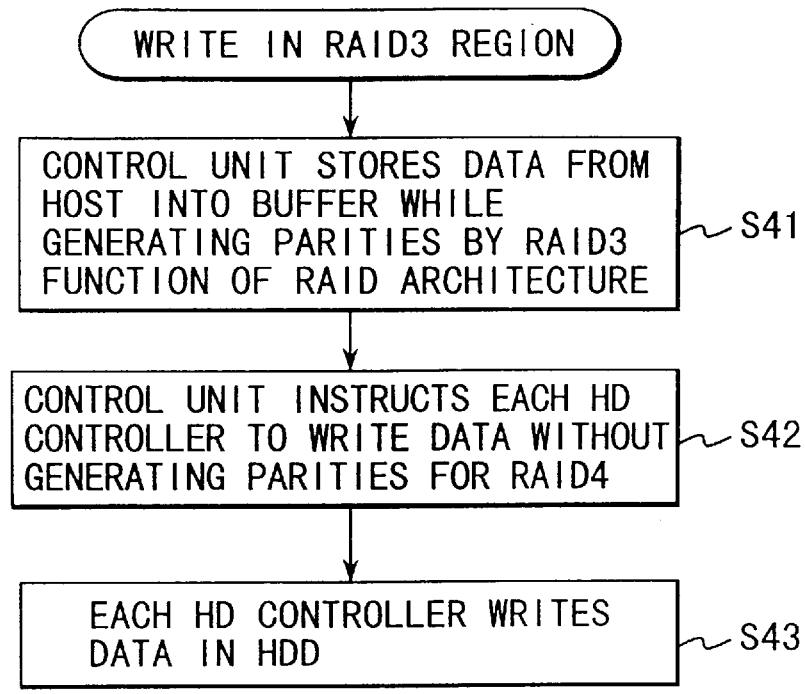
FIG. 7 is a flow chart illustrating data write in RAID3 region in the embodiment.

Data write in RAID3 region 312 will now be described with reference to the flow chart of FIG. 7.

In the case where an instruction from the host apparatus is one for writing large-volume data such as video data applied to a monitoring system, which is stored for a short time period, in RAID3 region 312, the control unit 15 instructs the RAID architecture 14 to start the function of RAID3. Thereby, the RAID mechanism 14 stripes the data (write data) from the host apparatus by RAID3, and generates associated parity data. The striped data (divided data) and parity data are stored in associated buffers 130-1 to 130-n in the buffer section 13 (step S41).

The control unit 15 instructs the HD controllers 120-1 to 120-n of HD controller section 12 to write the data stored in buffers 130-1 to 130-n into target HDDs 110-1i to 110-nj (j=1 to m) of the RAID4 groups 24-1 to 24-n without generating parity data for the RAID4 (step S42).

Then, each HD controller 120-i (i=1 to n) writes the data stored in buffers 130-i into target HDD 110-ij of the RAID4 group 24-i (i=i.e. target HDD 110-ij (j=1 to m) of RAID4 group 24-i (step S43).

(5) Read-out from RAID4 Region 313

Data read-out from RAID4 region 313 will now be described with reference to the flow chart of FIG. 8.

In the case where an instruction from the host apparatus is one for reading out small-volume data such as still image data from RAID4 region 313, the control unit 15 sends a read command for data read-out with a recovery function by RAID4 to HD controllers 120-i within the HD controller section 12 which corresponds to RAID4 group 24-i including target HDD 110-ij (i=1 to n; j=1 to m) (step S51).

The HD controller 120-i performs data read-out from the HDD 110-ij, as requested by the read command from the control unit 15 (step S52), and determines whether the data has been normally read (step S53).

If there is no error, the HD controller 120-i stores the data read out in step S52 into the buffer 130-i within the buffer section 13, and informs the control unit 15 of the normal completion of data read-out (step S54).

If there is an error, the HD controller 120-i executes recovery by RAID4 (step S55). Specifically, the HD controller 120-i performs the same read-out operation as in step S52 for the HDD 110-i1 to 110-im excluding the HDD 110-ij within the RAID4 group 24-i. If all data has been normally read, the recovery is determined to be feasible. By finding an exclusive OR of the read-out data, the data of HDD 110-ij is recovered.

When the recovery by RAID4 has been successively performed (step S56), the HD controller 120-i stores the recovered data into the buffer 130-i within the buffer section 13 and informs the control unit 15 of the normal completion of data read-out (step S57). On the other hand, if data has not successively been read out from any one of the HDDs, the HD controller 120-i determines that the recovery by RAID4 is not feasible and informs the control unit 15 of the abnormal end (read error) (step S58).

The control unit 15 monitors end information from HD controller 120-i (step S59). When normal end information is received, the control unit 15 does not instruct the RAID architecture 14 to start the RAID3 function and outputs the data in buffer 130-i directly to the host apparatus (step S60). If abnormal end information is received, the control unit 15 informs the host apparatus to the effect that the data recovery is unfeasible, and the control is finished with the error (step S61).

(6) Write in RAID4 Region 313

Figure 9:
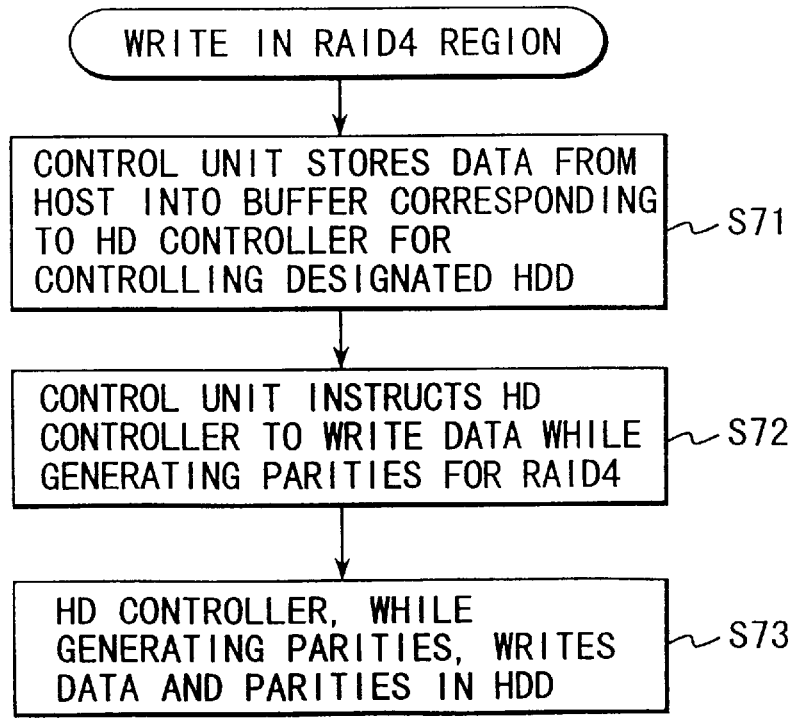
FIG. 9 is a flow chart illustrating data write in RAID4 region in the embodiment.

Data write in RAID4 region 313 will now be described with reference to the flow chart of FIG. 9.

In the case where an instruction from the host apparatus is one for writing small-volume data such as still image data in RAID4 region 313, the control unit 15 stores data (write data) from the host apparatus into buffer 130-i corresponding to the HD controller 120-i connected to target HDD 110-ij (i=1 to n; j=1 to m) (step S71).

The control unit 15 instructs the HD controller 120-i to write the data stored in buffer 130-i into target HDD 110-ij within RAID4 group 24-i while generating parity data for the RAID4 (step S72).

Then, each HD controller 120-i writes the data stored in buffers 130-i into target HDD 110-ij of the RAID4 group 24-i while generating parity data for the RAID4. In addition, the generated parity data is written in the HDD 110-im in RAID4 group 24-i (step S73). The parity data for RAID4 is generated in the same manner as those generated in step S23 in the data write in RAID3&4 region 311 (above item (2)), except that the parity data is generated by single HD controller 120-i.

Figure 8:
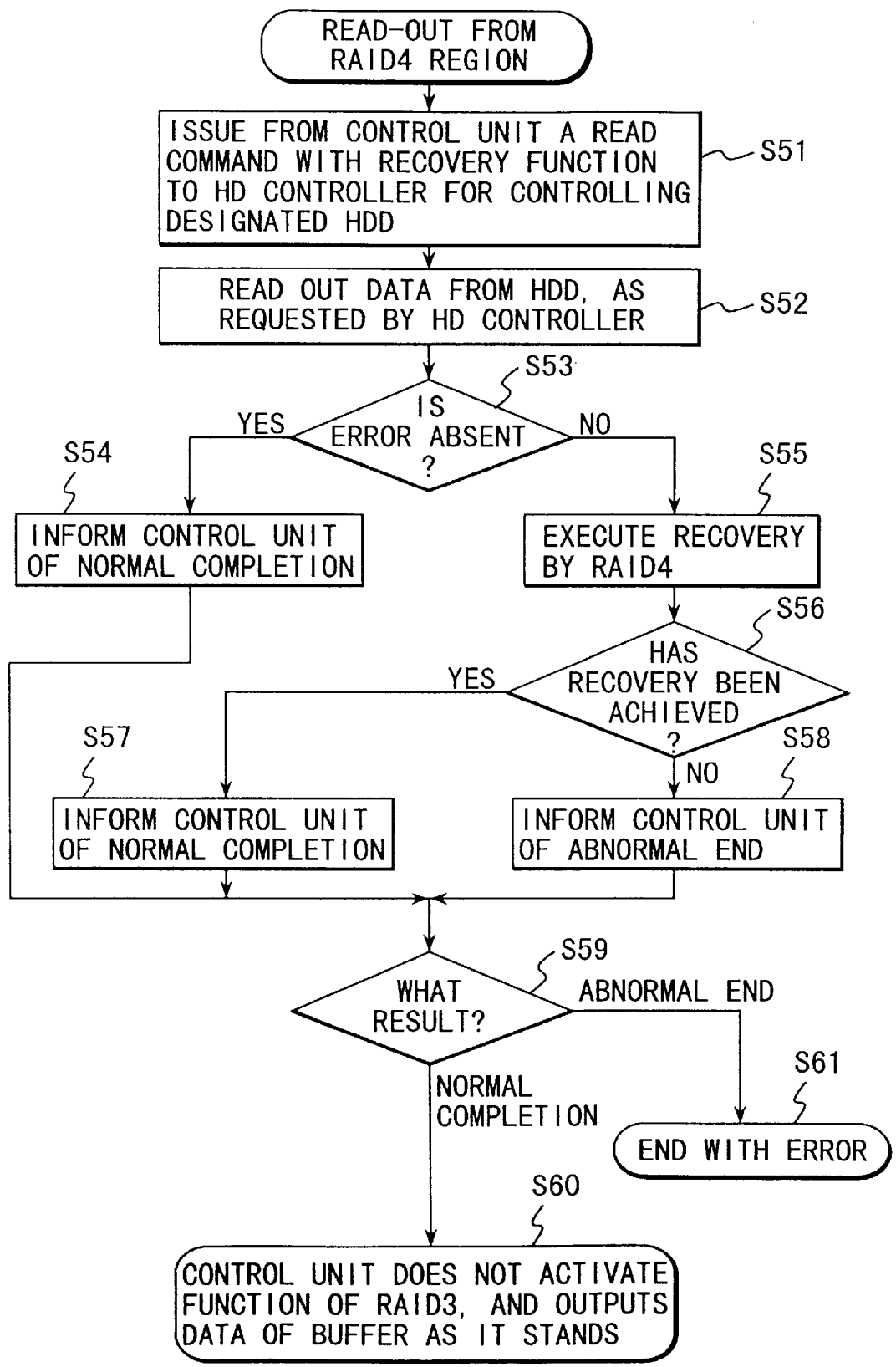
FIG. 8 is a flow chart illustrating data read-out from RAID4 in the embodiment.

In the read-out of small-volume data from the RAID4 region 313 according to the flow chart of FIG. 8, if the data read-out from the target HDD 110-ij has not normally been performed, a command is issued to read out data from all HDDs 110-i1 to 110-im, excluding the HDD 110-ij, of the RAID4 group 24-i including the HDD 110-ij, thereby to recover the data. At this time, if a new I/O request is sent to the control unit 15 from the host apparatus, the request is suspended until the recovery is completed. It is useless, however, that the new I/O request is suspended for the purpose of reading out small-volume data by RAID4, even when the HDD associated with the new I/O request is, for example, in the RAID3 group 23-j including the HDD 110-ij and parallel access can be performed.

An improved read-out operation for reading out data from the RAID4 region, which aims at solving the above problem, will now be described.

In this technique, one of three modes can be designated when the control unit 15 sends to the HD controller 120-i the read command for reading out data (small-volume data) from the RAID4 region 313. The three modes are (A) a mode with recovery by RAID4, (B) a mode without recovery by RAID4, and (C) a recovery mode by RAID4. The three modes will now be described.

(A) Mode with Recovery by RAID4

In this mode, the same operation as in the above item (5), i.e. the read-out from RAID4 region 313, is performed. Read command may possibly be sent to all HDD 110-i1 to 110-im of RAID4 group 24-i including target HDD 110-ij (i=1 to n; j=1 to m).

(B) Mode without Recovery by RAID4

In this mode, a read command is sent to only the target HDD 110-ij.

(C) Recovery Mode by RAID4

In this mode, read commands are sent to all HDDs excluding target HDD 110-ij, among the HDDs 110-i1 to 110-im of the RAID4 group 24-i including the target HDD 110-ij. Irrespective of the presence/absence of an error in the target HDD 110-ij, the data of the target HDD 110-ij is recovered from the data read from all HDDs of RAID4 group 24-i, excluding the HDD 110-ij. Accordingly, in this mode, it is ensured that no access is made to the target HDD 110-ij. However, there is a case where read-out not in mode (C) but in mode (A) is possible. This case will now be described with reference to FIG. 10.

Suppose that the host apparatus has instructed the control unit 15 to read out data from a region 100-1 in the HDD 110-i1, as shown in FIG. 10, among the HDDs 110-i1 to 110-im of RAID4 group 24-i. It is assumed that the region (read-out target region) 110-1 has a size corresponding to three sectors and there is an error in the top sector alone. Suppose also that there is an error in the last sector alone in a region 100-2 in the HDD 110-i2, which corresponds to the region 100-1 in the HDD 110-i1, and that there is no error in the corresponding regions in the HDDs excluding HDDs 110-i1 and 110-i2. Read-out from the HDDs is performed in units of a sector, or a minimum read-out unit.

In the above case, with respect to the top and second sectors of the region 110-1, the data in the region 110-1 in the HDD 110-i1 can be recovered in the recovery mode (C) by finding an exclusive OR value of the sectors of HDDs 110-i2 to 110-im which correspond to the top and second sectors of region 100-1, since these corresponding sections have no error. On the other hand, there is an error in the sector of HDD 110-i2 which corresponds to the last sector of region 100-1, the recovery will fail. Needless to say, if there is no error in the corresponding regions of HDDs 110-i2 to 110-im other than HDD 110-i1, an exclusive OR value can be found from the data read from the corresponding regions of HDDs 110-i2 to 110-im and thus the data corresponding to the data in the region 100-1 of HDD 110-i1 can be recovered.

When the data in the region 100-1 of HDD 110-i1 is to be read in the mode (A) with recovery, an error occurs at the time of reading the top sector of region 100-1. However, since there is no error in the corresponding sectors of HDDs 110-i2 to 110-im, the data in the region 100-1 can be recovered by finding an exclusive OR value of the corresponding sectors. The following sectors (second and third sectors) of region 100-1 have no error and data read-out from the HDD 110-i1 can be normally performed. Thus, the read-out operation is normally completed.

Figure 11:
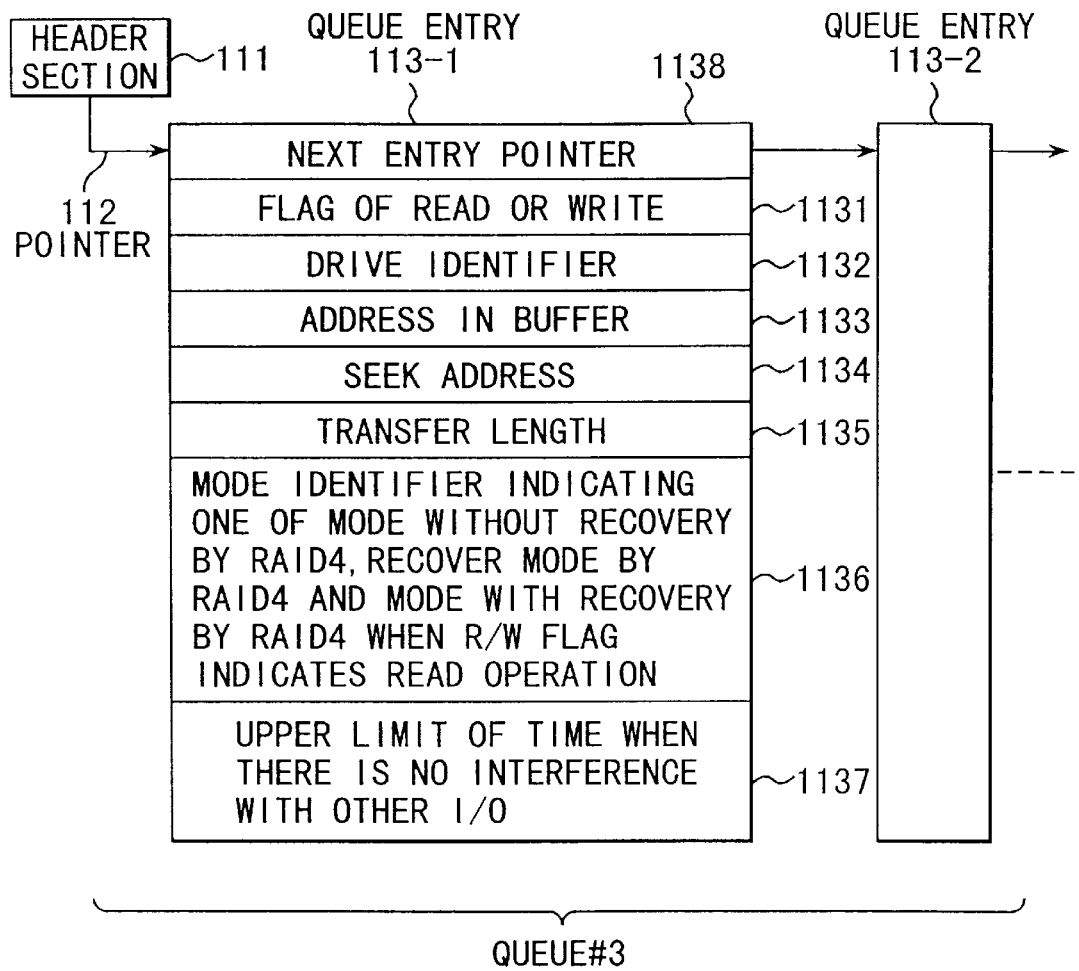
FIG. 11 shows an example of the structure of a queue (#3) for input/output to/from RAID4 region when the three modes are applied.

In the present embodiment, queues (queue entries), which are queues for awaiting input/output to/from RAID4 region 313 are provided in the control unit 15 shown in FIG. 1 for respective RAID groups (in this case RAID4 groups 24-1 to 24-n). FIG. 11 shows an example of a queue (hereinafter referred to as "queue #3") corresponding to one RAID4 group.

In FIG. 11, a queue entry (top queue entry) 113-1 designated by a pointer 112 held by a header section 111 comprises a flag (R/W flag) 1131 indicating a read operation or a write operation; a drive identifier 1132 of a target HDD (hard disk drive) associated with the read/write operation; a top address 1133 in buffer 130-i for temporarily storing read/write data; a seek address (seek address of RAID4 region 313 in the HDD identified by the drive identifier) 1134; a transfer length 1135; a mode identifier 1136; an upper limit 1137 of a time (assumed execution time) in the case where there is no interference with other I/O; and a next entry pointer 1138 indicating the next queue entry. When the R/W flag 1131 indicates the read operation, the mode identifier 1136 indicates one of the mode without recovery by RAID4, the recovery mode by RAID4 and the mode with recovery by RAID4. When the R/W flag 1131 indicates the write operation, the mode identifier 1136 always indicates the mode for generating parity data. Other queue entries 113-2, . . . , following the queue entry 113-1 have the same data structure as the queue entry 113-1.

Figure 12:
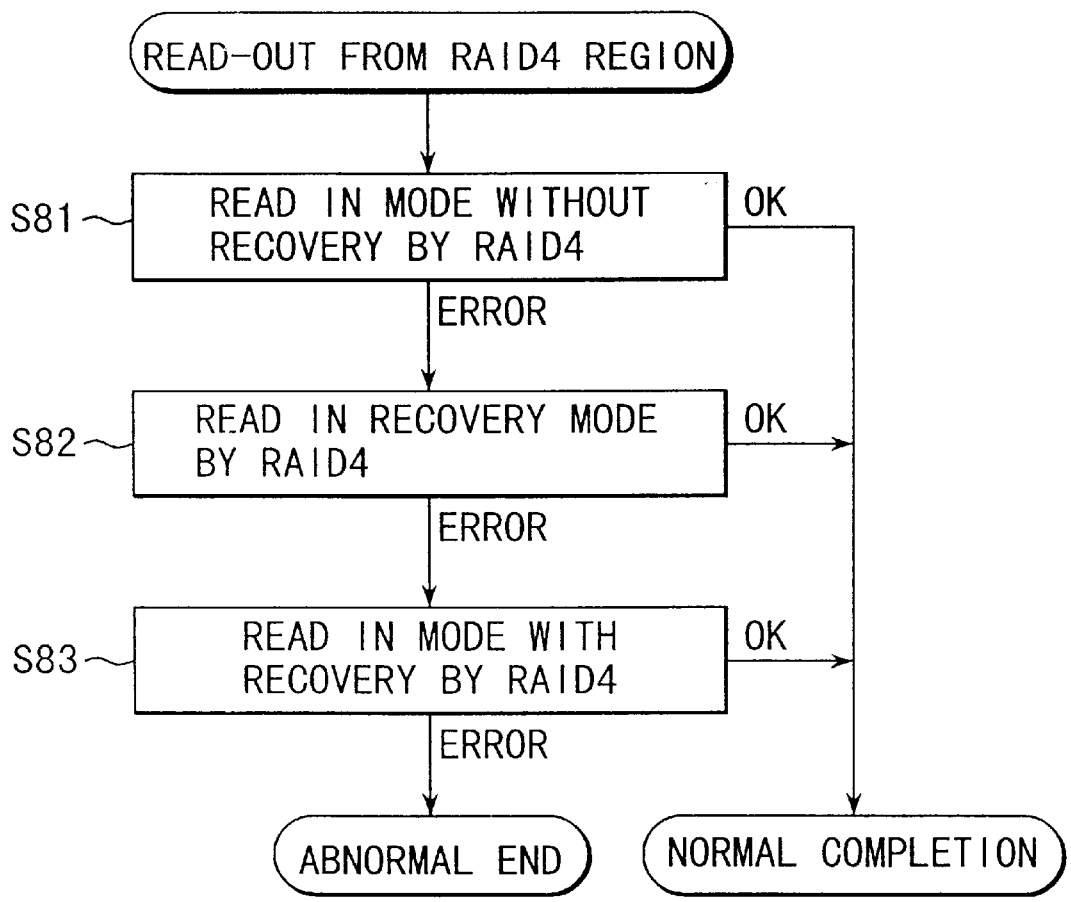
FIG. 12 is a flow chart illustrating an improved process of reading out data from RAID4 as illustrated in FIG. 8.

With reference to the flow chart of FIG. 12, a description will now be given of the execution of the I/O request set in the top queue entry 113-1 when the queue entry 113-1 has been generated as a result of the fact that the host apparatus instructed the control unit 15 to read out data by RAID4 from the region 100-1 of HDD 110-i1 in RAID4 group 24-i. Suppose that the R/W flag 1131 in the queue entry 113-1 indicates the read operation, the drive identifier 1132 indicates the HDD 110-i1, the seek address 1134 represents the top address of region 100-1 in the HDD 110-i1, the transfer length 1133 indicates three sectors, and the mode identifier 1136 indicates the mode without recovery by RAID4.

At first, according to the contents of the queue entry 113-1, the control unit 15 controls the HD controller 120-i of HD controller section 12 to perform data read in the mode without recovery by RAID4 (step S81).

In this case, the HD controller 120-i performs data read-out from the designated region 100-1 of HDD 110-i1.

If a read error occurs, the control unit 15 updates the mode identifier of the queue entry 113-1, which is being executed, to the recovery mode by RAID4. In addition, the control unit 15 updates the upper limit 1137 of time needed in the case of no interference with other I/O in accordance with the recovery mode of RAID4. Thus, rescheduling is performed to reconnect the queue entry 113-1, and the control awaits the opportunity. The updating of the upper limit 1137 will be described later.

When the updated queue entry 113-1 has become feasible, the control unit 15 controls, according to the contents of the entry 113-1, the HD controller 120-i of HD controller section 12 to perform read-out in the recovery mode by RAID4 (step S82).

In this case, the HD controller 120-i reads out data from the regions of other HDDs 110-i2 to HDD 110-im corresponding to the designated region 100-1 of HDD 110-i1. If the data has normally been read, an exclusive OR value thereof is found, thereby acquiring (recovering) data corresponding to the data of the designated region 100-1. On the other hand, if there is a read error, the control unit 15 updates the mode identifier of queue entry 113-1, which is being executed, to the mode with recovery by RAID4. In addition, the control unit 15 updates the upper limit 1137 of time needed in the case of no interference with other I/O in accordance with the mode with recovery by RAID4. Thus, the queue entry 113-1 is reconnected, and the control awaits the opportunity.

The I/O request for HDDs excluding the HDD for data read-out is feasible during a time period between the data read in the mode without recovery by RAID4 and the data read in the recovery mode by RAID4.

If the updated queue entry 113-1 becomes feasible, the control unit 15 controls the HD controller 120-i of HD controller section 12 so as to read data in the mode with recovery by RAID4 according to the contents of the entry 113-1 (step S83).

In this case, the HD controller 120-i first reads data from the designated region 100-1 of HDD 110-i1. If a read error has occurred, the HD controller 120-i reads data from the corresponding regions of the remaining HDDs 110-i2 to 110-im other than the HDD 110-i1. If such data has been normally read, an exclusive OR value thereof is found. Thus, the operation for recovering the data corresponding to the data in the region 100-1 of target HDD 110-i1 is repeated in units of, e.g. a minimum read-out unit (in units of a sector in this case).

In the present embodiment, the data read by RAID4 is not performed in the mode with recovery from the beginning (in which another I/O request is suspended or set in a wait state). Rather, at first, the data is read in the mode without recovery by RAID4 (in which I/O requests for the HDDs other than the target HDD can be executed in parallel). If a read error has occurred, data read is performed in the recovery mode by RAID4 (in which another I/O request for the target HDD is feasible). If a read error has occurred once again, the read in the mode with recovery by RAID4 is performed.

Specifically, in the present embodiment, the read of small-volume data by RAID4 is performed by preferentially adopting the method which least influences the scheduling of read-out of large-volume data such as video data, and the operated HDD is finely controlled. Accordingly, the number of opportunities for reading small-volume data can be increased without influencing the scheduling of read-out of large-volume data.

At the time of scheduling, the control unit 15 omits steps S81 and S82 when other I/O requests, in particular, I/O requests of large-volume data to RAID3&4 region 311 and RAID3 region 312, are not crowded.

Figure 4:
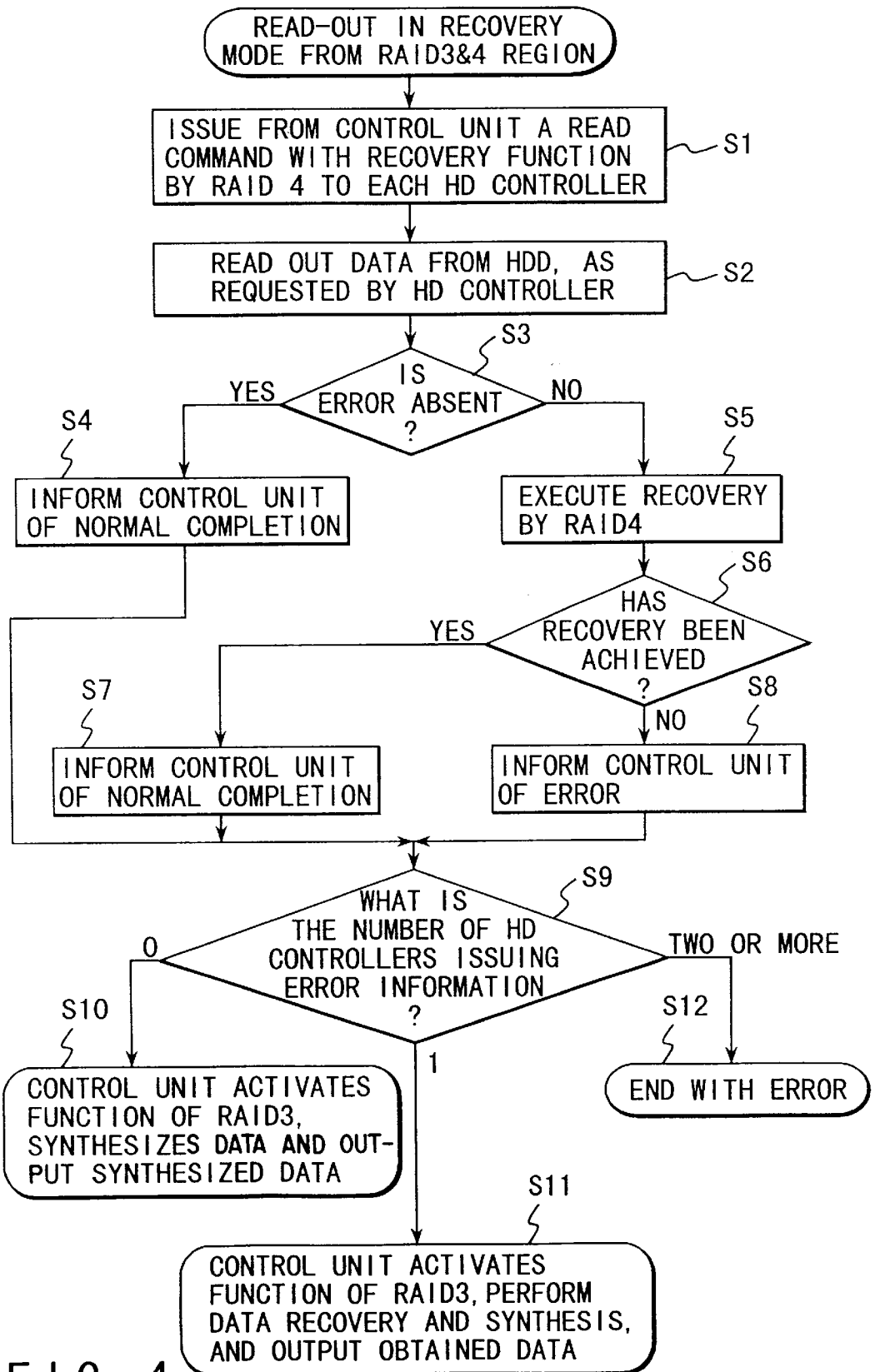
FIG. 4 is a flow chart illustrating data read-out in a mode with recovery from RAID3&4 region in the embodiment.

In the case of data read-out in the mode with recovery from RAID3&4 according to the above-described flow chart of FIG. 4, each HD controller 120-i (i=1 to n) reads out data from the HDD 110-ij (j=1 to m), as requested by the read command from the control unit 15. If the data has not been normally read, the HD controller 120-i accesses the HDDs 110-i1 to 110-im of RAID4 group 24-i, thereby performing a recovery process by RAID4. However, if only one HD controller 120-i performs the recovery process, the time for recovery by RAID4 is wasted since recovery by RAID3 can be performed by the RAID architecture 14 on the basis of the contents of buffers 130-1 to 130-m.

A description will now be given of an improved technique of reading data from RAID3&4 region 311 in the mode with recovery, which can solve the above problem.

In this technique, the control unit 15 includes two kinds of queue entries, described below, for managing input/output to/from the RAID3&4 region 311 and RAID3 region 312, in addition to the queue #3 for managing input/output to/from the RAID4 region 313.

Figure 13:
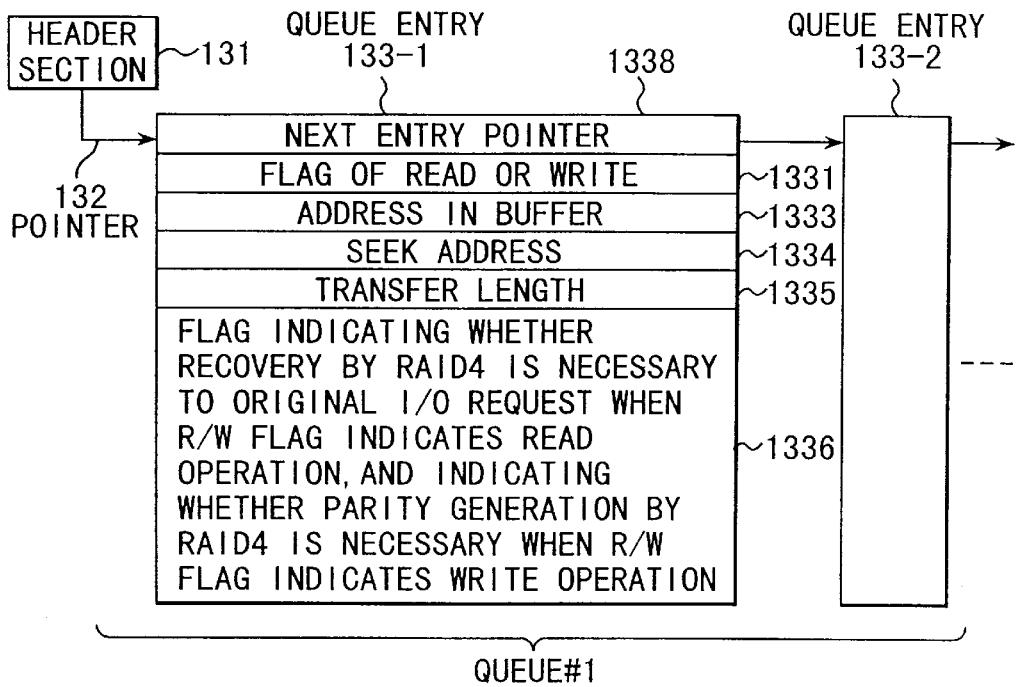
FIG. 13 shows an example of the structure of a queue (#1) for managing input/output to/from RAID3&4 region and RAID3 region, which queue is applied to improve data read-out in a mode with recovery from RAID3&4 region as illustrated in FIG. 4.

FIG. 13 shows an example of an ordinary I/O request queue (hereinafter referred to as "queue #1") for input/output to/from RAID3&4 region 311 and RAID3 region 312. There are provided the same number of queues #1 as the number of RAID3 groups (RAID3 groups 23-1 to 23-m in this case).

In FIG. 13, a queue entry (top queue entry) 133-1 designated by a pointer 132 held by a header section 131 comprises a flag (R/W flag) 1331 indicating a read operation or a write operation; a top address 1333 in buffer 130-i for temporarily storing read/write data; a seek address (seek address of RAID3 group 23-i) 1334; a transfer length 1335;

a mode flag 1336; and a next entry pointer 1338 indicating the next queue entry. Other queue entries 133-2, . . . , following the queue entry 133-1 have the same data structure as the queue entry 133-1.

When the R/W flag 1331 indicates the read operation, the mode flag 1336 indicates whether recovery by RAID4 is necessary to the original I/O request. Only in the case of reading data in the mode with recovery from RAID3&4 region 311, will recovery by RAID4 be necessary to the original I/O request. When the R/W flag 1331 indicates the write operation, the mode flag 1336 indicates whether parity generation by RAID4 is necessary. The parity generation is required only in the case of data write to the RAID3&4 region 311.

Figure 14:
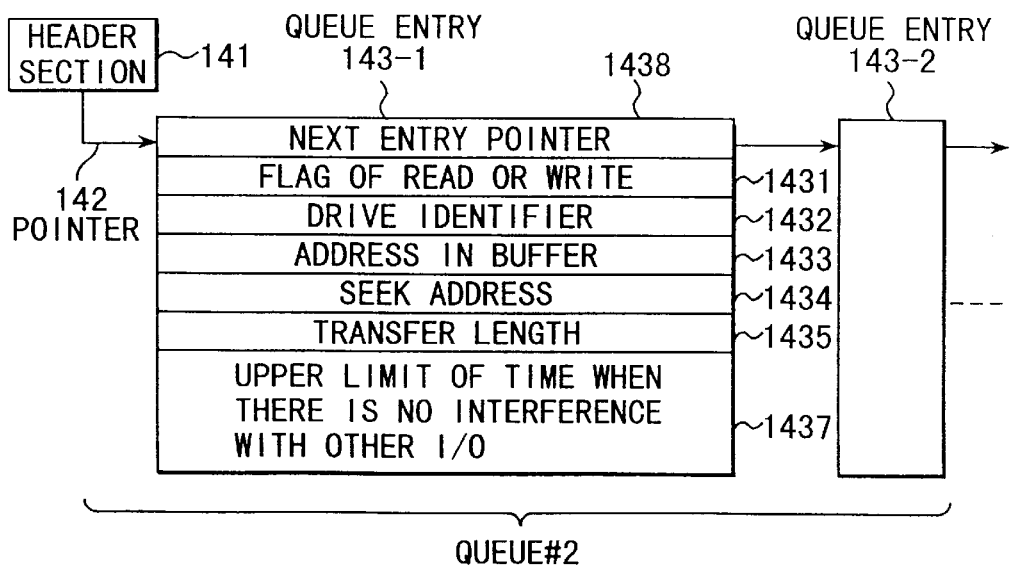
FIG. 14 shows an example of the structure of a queue (#2) for reading out data in the mode with recovery form RAID3&4 region or generating parity of RAID4, which queue is applied to improve the data read-out in the mode with recovery from RAID3&4 region as illustrated in FIG. 4.

FIG. 14 shows an example of a queue (hereinafter referred to as "queue #2") of a request for data read-out from RAID3&4 region 311 in the mode with recovery by RAID4, or for parity generation (generation and write of parity data) by RAID4. There are provided the same number of queues #2 as the number of RAID4 groups (RAID4 groups 24-1 to 24-n in this case).

In FIG. 14, a queue entry (top queue entry) 143-1 designated by a pointer 142 held by a header section 141 comprises a flag (R/W flag) 1431 indicating a read operation (data read from RAID3&4 region 311 in the mode with recovery by RAID4) or a write operation (data write requiring parity generation by RAID4); an identifier (drive identifier) 1432 of a target HDD (hard disk drive) associated with the read/write operation; a top address 1433 in buffer 130-i for temporarily storing read/write data; a seek address (seek address in the HDD indicated by the drive identifier) 1434; a transfer length 1435; an upper limit 1437 of a time required in the case where there is no interference with other I/O; and a next entry pointer 1438 indicating the next queue entry. Other queue entries 143-2, . . . , following the queue entry 143-1 have the same data structure as the queue entry 143-1.

Figure 15:
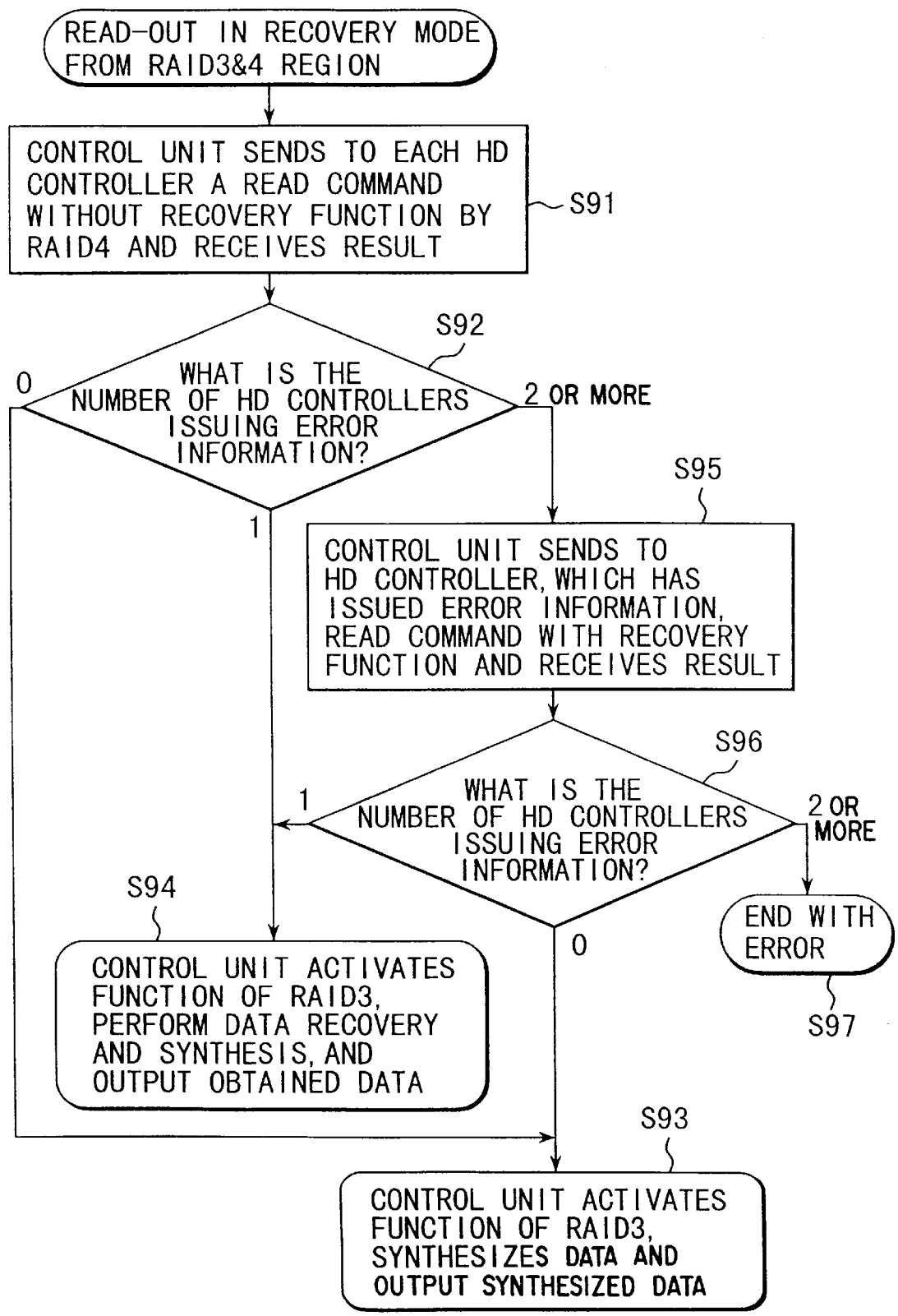
FIG. 15 is a flow chart illustrating an improved process of reading out data in the mode with recovery from RAID3&4 region as illustrated in FIG. 4.

With reference to the flow chart of FIG. 15, a description will now be given of the execution of the I/O request set in the top queue entry 133-1 of queue #1 in the case where the queue entry 133-1 has been generated as a result of the fact that the host apparatus instructed the control unit 15 to read data in the mode with recovery from RAID3&4 region 311. Suppose that the R/W flag 1331 in the queue entry 133-1 indicates the read operation and the mode flag 1336 indicates that the recovery by RAID4 is necessary to the original I/O request.

According to the contents of the queue entry 133-1 or the top entry of queue #1, the control unit 15 sends to each HD controller 120-i (i=1 to n) of HD controller section 12 a read command without a recovery function by RAID4, and receives the result (step S91).

The HD controller 120-i reads out data from the HDD 110-ij (j=1 to m), as requested by the read command from the control unit 15. If the data has normally been read out, the read-out data is stored in the buffer 130-i and the control unit 15 is informed of the normal completion. If the data could not normally be read, the HD controller 120-i informs the controller 15 of the error.

If the control unit 15 has been informed by each HD controller 120-i of the normal completion in step S91, the control unit 15 counts the number of HD controllers 120-i which have issued error information (step S92).

If the number of HD controllers 120-i which have issued error information is zero, the control unit 15 determines that the data requested of the HD controllers 120-1 to 120-n is stored in the buffers 130-1 to 130-n of buffer section 13, and the control advances to step S93. In step S93, the control unit 15 instructs the RAID architecture 14 to activate the function of RAID3. After the data of buffers 130-1 to 130-(n−1) is synthesized, the synthesized data is output to the host apparatus.

If the number of HD controllers 120-i which have issued error information is one, the control unit 15 carries out a control in step S94. In step S94 the control unit 15 instructs the RAID architecture 14 to activate the function of RAID3 and recover the data, which is to be read out by the HD controller 120-i issuing the error information, in the buffer 130-i from the data of buffers 130-1 to 130-n corresponding to the HD controllers 120-1 to 120-n excluding the sole HD controller 120-i issuing the error information. After the data of buffers 130-1 to 130-(n−1) is synthesized, the synthesized data is output to the host apparatus.

If the number of HD controllers 120-i which have issued error information is two or more (the probability of two or more HD controllers issuing error information is much less than that of one HD controller issuing error information), the control unit 15 generates the queue entry 143-1 corresponding to queue entry 133-1, as shown in FIG. 14, and connecting it to queue #2. According to the contents of the queue entry 143-1, the control unit 15 issues read commands for read-out with recovery functions by RAID4 to the two or more HD controllers 120-i issuing error information and receives the result (step S95).

The two or more HD controllers 120-i, to which the control unit 15 has issued the read commands for read with recovery functions by RAID4 perform data read-out from the HDD 110-ij (j=1 to m), as requested by the read commands from the control unit 15. If there is an error, the HD controllers 120-i executes recovery by RAID4, as in step S5 in FIG. 4. If the recovery has been completed, the HD controllers 120-i inform the control unit 15 of the normal completion. If not, the HD controllers 120-i inform the control unit 15 of the error.

If the control unit 15 has been informed by each HD controller 120-i of the normal completion in step S95, the control unit 15 counts the number of HD controllers 120-i which have issued error information (step S96).

If the number of HD controllers 120-i which have issued error information is zero, the control unit 15 determines that the data requested of the HD controllers 120-1 to 120-n is stored in the buffers 130-1 to 130-n of buffer section 13, and the control advances to step S93. In step S93, the control unit 15 instructs the RAID architecture 14 to activate the function of RAID3. After the data of buffers 130-1 to 130-(n−1) is synthesized, the synthesized data is output to the host apparatus.

If the number of HD controllers 120-i which have issued error information is one, the control unit 15 carries out a control in step S94. In step S94 the control unit 15 instructs the RAID architecture 14 to activate the function of RAID3 and recover the data, which is to be read out by the HD controller 120-i issuing the error information, in the buffer 130-i from the data of buffers 130-1 to 130-n corresponding to the HD controllers 120-1 to 120-n excluding the sole HD controller 120-i issuing the error information. After the data of buffers 130-1 to 130-(n−1) is synthesized, the synthesized data is output to the host apparatus.

In the present embodiment, if only one HD controller 120-i has issued error information, the data, which is to be read out by the HD controller 120-i issuing the error information, can be recovered in the buffer 130-i from the data of buffers 130-1 to 130-n corresponding to the HD controllers 120-1 to 120-n excluding the sole HD controller 120-i issuing the error information. Accordingly, the target data can be read in the buffer 130-i with no retry time. In addition, even when two or more HD controllers have issued error information (the probability of such a case being very low), the target data can be read out though the read-out time slightly increases. Thus, the data read-out time in the total system is decreased.

Figure 5:
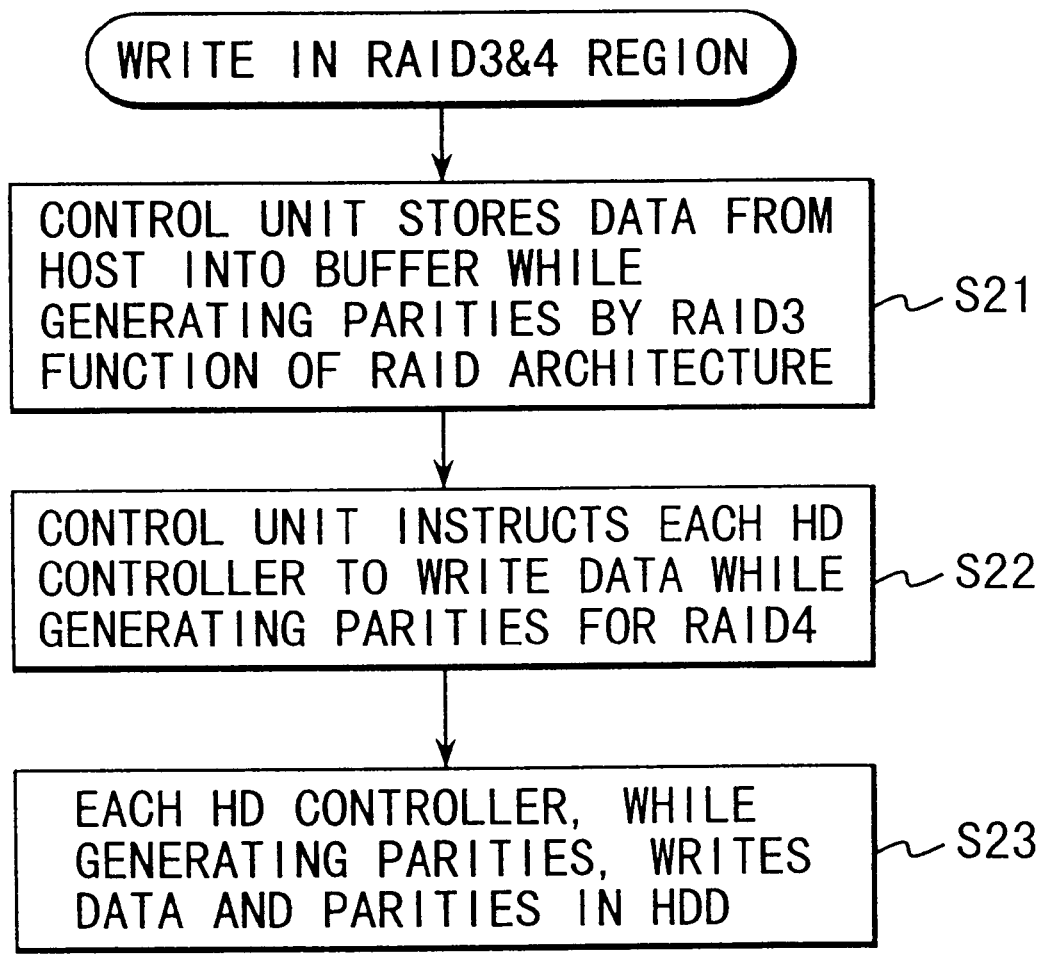
FIG. 5 is a flow chart illustrating data write in RAID3&4 region in the embodiment.

In the data write to RAID3&4 region 311 according to the above-described flow chart of FIG. 5, the following operations need to be performed in order to generate parity data for RAID4. For example, in the case of RAID4 group 24-i, data has to be read out from the corresponding regions of HDDs 110-i1 to 110-i(m−1) of the group 24-i, and an exclusive OR value thereof has to be found to generate the parity data. Thus, a great deal of time is required in writing data in the RAID3&4 region 311. Consequently, it is difficult, for example, to store in real time in the RAID3&4 region 311 of the disk array apparatus such data as is obtained by digitizing video signals from a video camera and encoding the digitized signals (i.e. an output from a video encoder).

With reference to the flow chart of FIG. 16, a description will now be given of an improved technique of writing data in RAID3&4 region 311, which can solve the above problem.

When the control unit 15 has been instructed by the host apparatus to write data in RAID3&4 region 311, the control unit 15 generates a queue entry (to be registered) to be connected to the queue #1 and connects the queue entry to the queue #1 (step S101). Suppose that the queue entry 133-1 shown in FIG. 13 has been generated and connected to the queue #1. In this case, the R/W flag 1331 of queue entry 133-1 indicates the write operation and the mode flag 1336 indicates that the parity generation by RAID4 is necessary.

The control unit 15 instructs the RAID architecture 14 to activate the function of RAID3 according to the queue entry 133-1, thereby storing data and its parity data from the host apparatus in the associated buffers 130-1 to 130-n in the buffer section 13. In addition, the control unit 15 controls the HD controllers 120-1 to 120-m to perform data write by RAID3, thereby writing the data (data or its parity data from the host apparatus) of buffers 130-1 to 130-n in the HDDs 110-1j to HDD 110-nj of the designated RAID3 group 23-j (j=1 to m−1) (step S102).

If the data write by RAID3 according to the queue entry 133-1 has normally been completed, the control unit 15 generates a queue entry to be connected to queue #2, on the basis of the queue entry 133-1, and connects the generated queue entry to the queue #2 (step S103). This process is performed for each RAID4 group. Suppose that the queue entry 143-1 shown in FIG. 14 has been generated and connected to the queue #2. In this case, the R/W flag 1331 of queue entry 143-1 indicates the write operation.

If the generated queue entry 143-1 has been connected to the queue #2, the control unit 15 informs the host apparatus of the normal completion even if the parity generation and write by RAID4 is not performed (step S104).

On the other hand, each queue entry 143-1 connected to the queue #2 of each RAID4 group is fetched out later and executed, and parity data for RAID4 is generated (step S105). The parity data generated for each RAID4 group is written in the HDDs 110-im (i=1 to n) in the RAID4 group.

In the present embodiment, data write in RAID3&4 region 311 is carried out in two stages: data and parity write performed during parity generation by RAID3; and parity generation/write by RAID4. After the data write of the former, which requires a short time period, has normally completed, the host apparatus is informed of the normal completion. Thus, the apparent performance of data write in RAID3&4 region 311 is enhanced. Required performance can be attained even when a real-time encode output is stored directly in the disk array apparatus.

In this embodiment, until the write of the latter (parity generation/write by RAID4) is completed, the data in question is merely protected by RAID3. However, the protection of data can be ensured to some degree by this technique, and since this state is only a temporary one, no problem will arise.

In step S103, however, it is necessary to connect the generated queue entry 143-1 before any of the queue entries of the same queue # requesting the read in the mode with recovery by RAID4. The reason for this is that erroneous data is read if the operations are performed in the order: data read in the mode with recovery by RAID4; data write in another RAID3 group; retry of data read in the mode with recovery by RAID4; and parity generation/write. This order of operations must be avoided.

Data after the time point of issuance of the read command is read if the operations are carried out in the order: data read in the mode with recovery by RAID4; data write in the same RAID3 group; retry of data read in the mode with recovery by RAID4; and parity generation/write. The host apparatus has a duty to void this order of operations.

Figure 18:
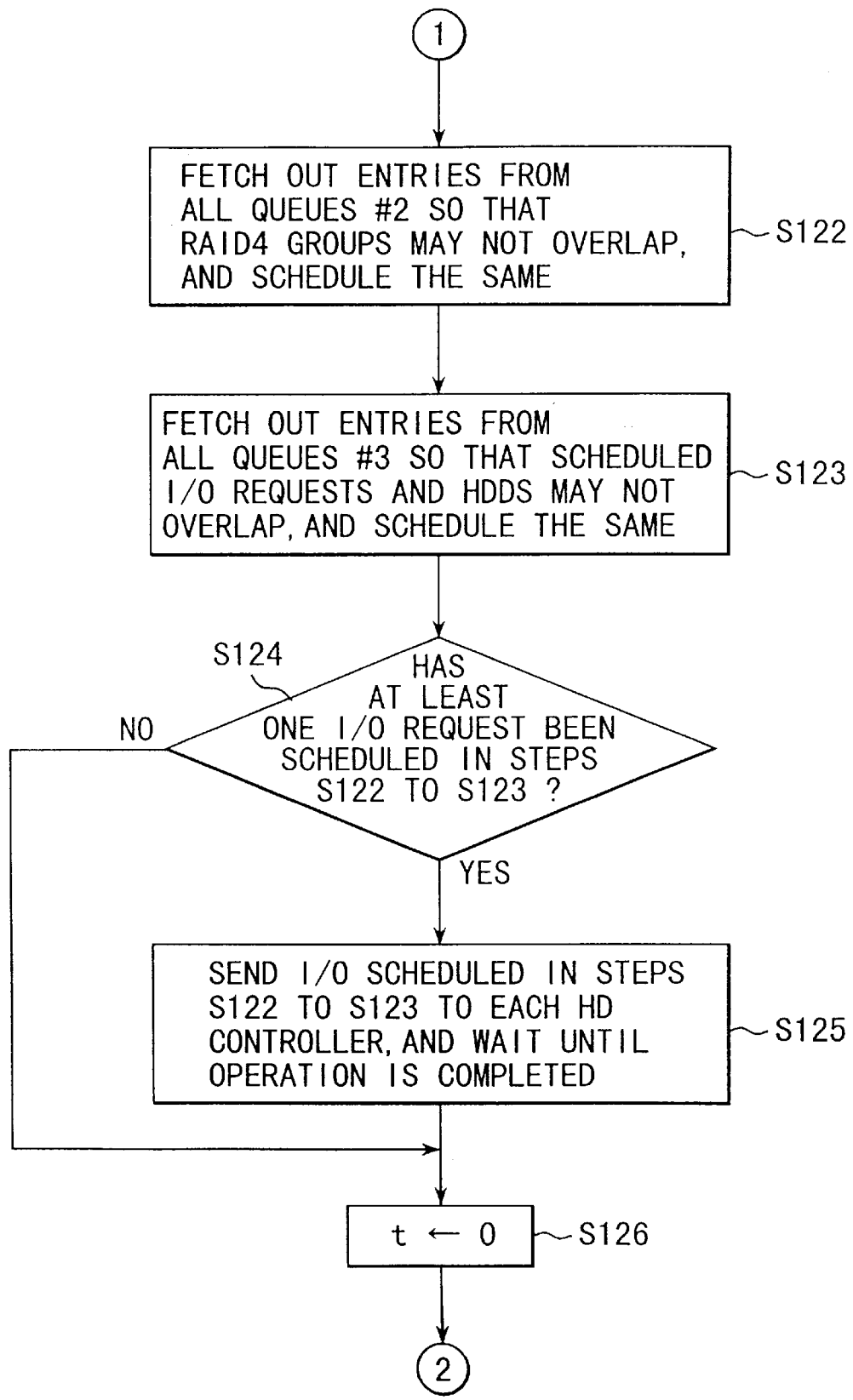
FIG. 18 is the other part of the flow chart illustrating the process of scheduling I/O requests in the embodiment.

The scheduling for I/O requests in the entire display array apparatus shown in FIG. 1 will now be described with reference to the flow charts of FIGS. 17 and 18.

In this embodiment, like the B-register 151 described in the first embodiment, the three registers, i.e. a t-register 152, a T-register 153 and an A-register 154, are assigned to regions of predetermined addresses in the nonvolatile memory 150 of control unit 15.

The t-register 152 stores a variable t used by the control unit 15, and is used to accumulate a difference between a value (T) of T-register 153 and an actually consumed time for I/O processing.

The T-register 153 stores the value T designated by a control command from the host apparatus at the time of start-up of the system. In the present embodiment, an I/O request to be registered in the queue #1 is treated as divided requests if the transfer length of the I/O request is greater than a predetermined length. In this case, each of the divided requests has that predetermined length as a maximum transfer length. Thus, a plurality of queue entries are generated and connected to the queue #1. The reason is that by this technique an approximate time needed for executing the contents (i.e. I/O request) of each entry connected to the queue #1 can be made substantially constant. An allowance time is added to this approximate time, and the total time is defined as value T by the host computer and set in the T-register 153.

The A-register 154 stores a value A designated by a control command from the host apparatus at the time of start-up of the system. As mentioned above, in the queues #2 and #3, when queue entries are connected, the upper limit of required time is estimated from a necessary number of times of I/O, transfer length, etc. The estimated upper limit values are set in the entries as upper limit values 1137 and 1437 of time which is needed when there is no interference with other I/O. The value A set in the A-register 154 is greater than the upper limits of time required to execute the I/O requests registered in the queues #2 and #3 (the upper values 1137 and 1437 of time needed when there is no interference with other I/O) and the content (T) of T-register 153.

In the disk array apparatus shown in FIG. 1, initial value "0" is set in the t-register 152 at the time of starting up the system (step S111).

If some I/O request is delivered from the host apparatus to the control unit 15, the control unit 15 receives the I/O request, generates a queue entry for a queue matching with the I/O request and connects the queue entry to the corresponding queue (one of queues #1 to #3) (step S112).

Subsequently, the control unit 15 compares value t of t-register 152 and value A of A-register 154 and determines whether t<A (step S113). At this time, since t=0 in the process of step S111, the condition of t<A is met.

The control unit 15 then fetches out queue entries from queues #1 prepared for respective RAID3 groups 23-1 to 23-m so that the groups of RAID3 may not overlap, and schedules the queue entries (step S114).

Next, the control unit 15 fetches out queue entries from queues #2 prepared for respective RAID4 groups 24-1 to 24-n so that the upper limit value of required time (upper limit value 1437 of time needed when there is no interference with other I/O) may be less than value T of T-register 153 and the groups of RAID3 may not overlap, and schedules the queue entries (step S115).

Then, the control unit 15 fetches out queue entries from queues #3 prepared for respective RAID4 groups 24-1 to 24-n so that the upper limit value of required time (upper limit value 1137 of time needed when there is no interference with other I/O) may be less than value T of T-register 153 and the I/O requests scheduled in steps 114 and 115 and the HDDs may not overlap, and schedules the queue entries (step S116).

The control unit 15 determines whether at least one I/O request has been scheduled in steps S113 to S116 (step S117). If at least one I/O request has been scheduled, the value t of t-register is updated to value t+T (T in this case) obtained by adding value T of T-register 153 to the value t (step S118).

The control unit 15 sends the I/O requests scheduled in steps S113 to S116 to each HD controller 120-i, and waits until all I/O requests are completed (step S119). If all I/O requests are completed in step S119, the value t of t-register 152 is updated to a value obtained by subtracting the passage time (required time) of the I/O request from the value t (t=T in this case) (step S120), and the control returns to step S112. Since Y>the passage time of I/O request, the value t of t-register after execution of steps S118 to S120 increases. The actual passage time is less than T.

If steps S118 to S120 are repeated, the condition (t<A) in step S113 will not be met at last.

Besides, if none of I/O requests is scheduled in steps S113 to S116, the value t of t-register 152 is updated to the value A of A-register 154 (step S121) and the control returns to step S112. Thus, the condition (t<A) in step S113 will not be met shortly.

In the present embodiment, the loop of steps S112 to S120 is finished at some time.

If the condition (t<A) in step S113 fails to be met, the control unit 15 advances to the process of step S122 and subsequent steps. Specifically, the control unit 15 then fetches out queue entries from all queues #2 so that the groups of RAID4 may not overlap, and schedules the queue entries (step S122).

Then, the control unit 15 fetches out queue entries from all queues #3 so that the I/O requests scheduled in step S122 and the HDDs may not overlap, and schedules the queue entries (step S123).

Subsequently, the control unit 15 determines whether at least one I/O request has been scheduled in steps S122 and S123 (step S124). If at least one I/O request has been scheduled, the control unit 15 sends the I/O request(s) scheduled in steps S122 and S123 to each HD controller 120-i and waits until all I/O request(s) is completed (step S125). If all I/O request(s) is completed in step S125, the control unit 15 updates the value t of t-register 152 to initial value "0" (step S126) and the control returns to step S112. If none of I/O requests is scheduled in steps S122 and S123, the control unit 15 skips the processing of step S125 and advances to the processing of step S126. Thus, the control unit 15 updates the value t of t-register 152 to initial value "0".

In this embodiment, if the process of step S122 and following steps is executed, the value t of t-register 152 becomes zero in step S126 at last and the condition (t<A) of step S113 is met. Accordingly, the process of step S122 and following steps will not be executed continuously. If the process of step S122 and following steps is executed, the actual passage time is less than value A.

As is clear from the above description, in the scheduling of this embodiment, if a new entry is registered when the queue #1 is empty, the entry (i.e. I/O request indicated by the entry) is scheduled within a time period of (A+T). If a new entry is registered in the state in which, e.g. a p-number of entries are connected to the queue #1, a maximum time needed for completion of scheduling of the top entry is (A+T) and the upper limit of time needed for I/O requests of p-number of entries is pT. Thus, the newly registered entry (i.e. I/O request indicated by the entry) is scheduled within a time period of (A+(p+1)T). In other words, the access time for the I/O request in the queue #1 is ensured.

In the scheduling according to this embodiment, the I/O request can be executed at a rate of once in time T if the queue #1 is prevented from becoming empty by the control of the host apparatus. That is, the rate of I/O requests in the queue #1 is ensured. However, in the case where an I/O request in the mode with recovery has been issued, if it is reconnected to the queue #2, the issuance of information on the completion of I/O request is delayed.

In the scheduling according to this embodiment, even when entries are always present on the queue #1, there are opportunities at which entries are scheduled on the queues #2 and #3.

Figure 19:
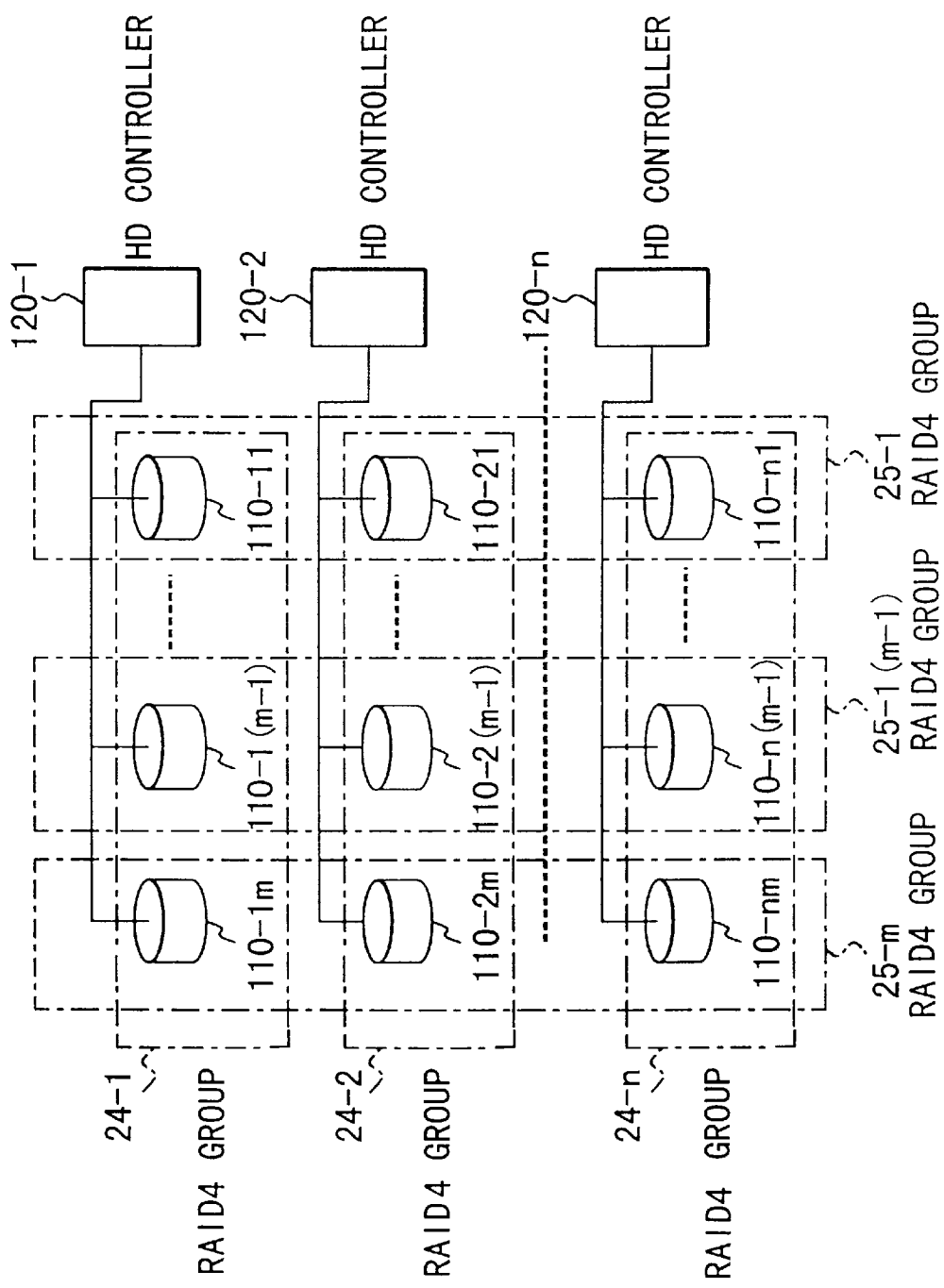
FIG. 19 shows a modification of the structure shown in FIG. 2.

In the above-described embodiment, the HDDs 110-11 to 110-n1, . . . , 110-1m to 10-nm arranged in y-direction (column direction) in the HDD group 110 shown in FIG. 1 constitute RAID3 groups 23-1, . . . , 23-m, as shown in FIG. 2. However, the arrangement of HDDs is not limited to this. For example, the HDDs 110-11 to 110-n1, . . . , 110-1m to 10-nm arranged in y-direction (column direction) may constitute RAID4 groups 25-1, . . . 25-m, as shown in FIG. 19. This structure is similar to the structure of the first embodiment, except that the execution function for RAID3 in the control unit 15 shown in FIG. 1 is replaced with the execution function for RAID4.

In the structure shown in FIG. 19, one RAID4 group 24-i is connected to one HD controller 120-i (i=1 to n). However, all HD controllers 120-i (i=1 to n) may be connected to a plurality of groups.

In the structure shown in FIG. 19, when recovery for I/O error needs to be performed, the frequency of access to the buffer section 13 by RAID architecture 14 increases. However, small-volume data such as still image data can be assigned to the RAID3&4 region 311 (to be called "RAID4&4 region" in this structure). Thus, small-volume data can be doubly protected by RAID.

As has been described above in detail, a plurality of disk array systems can be realized on the same disk apparatus, and double display array protection is achieved. Therefore, the reliability is enhanced, different kinds of data can be treated, and optimal access corresponding to the kind and use of data can be performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. A disk array apparatus for a multimedia server, the apparatus comprising:
    a first group of disk drives arranged in a first direction; and
    a second group of disk drives arranged in a second direction different from the first direction, the first group of disk drives and the second group of disk drives logically arranged in two dimensions, a disk region of each of the first and second groups of disk drives being divided for use into a first region for storing first large-volume data, a second region for storing second large-volume data different from the first large-volume data and a third region for storing small-volume data, each of lines of the disk drives arranged in the first direction constituting a first disk array group, all disk drives of said first disk array group being accessed in parallel, each of lines of the disk drives arranged in the second direction constituting a second disk array group, all disk drives of said second disk array group being accessed in parallel.

2. A disk array apparatus for a multimedia server, the apparatus comprising:
    a group of disk drives logically arranged in two dimensions represented by a first direction and a second direction, a disk region of each disk drive being divided for use into a first region for storing first large-volume data, a second region for storing second large-volume data different from the first large-volume data and a third region for storing small-volume data, each of lines of the disk drives arranged in the first direction constituting a first disk array group, all disk drives of said first disk array group being accessed in parallel, each of lines of the disk drives arranged in the second direction constituting a second disk array group, all disk drives of said second disk array group being accessed in parallel;
    disk controllers provided for the respective lines of the disk drives arranged in the second direction (row direction), for access-controlling the disk drives of the associated lines;
    control means for controlling each disk controller according to a request from a host apparatus; and
    input/output means for performing data input/output between itself and each disk controller under control of the control means, the input/output means being capable of performing error correction on the basis of data read out from each disk controller and generating first-type parity data serving as error correction information of write data supplied from the host apparatus,
    wherein divided data of said first large-volume data or the first-type parity data serving as the error correction information of this divided data is located on the first region of each disk drive of the first disk array group,
    divided data of said second large-volume data or the first-type parity data serving as the error correction information of this divided data is located on the second region of each disk drive of the first disk array group,
    divided data of said small-volume data or second-type parity data serving as the error correction information of this divided data is located on the third region of each disk drive of the second disk array group, and
    second-type parity data or error correction information of the divided data located on the first region of each of the other disk drives in the same second disk array group is located on the first region of each of the disk drives of the second disk array group.

3. The disk array apparatus according to claim 2, wherein when the control means is requested by the host apparatus to read out data from said first region, the control means instructs each disk controller to read out data from the first region of each disk drive of the first disk array group or a target first disk array group,
    in case of a read-out error, the control means reads out data from the corresponding first regions of the other disk drives of the second disk array group, to which the disk drive associated with the read-out error belongs, and performs a read-out control in a mode with recovery by a first system for performing error correction based on the read-out data,
    when only one of the disk controllers cannot perform error correction, the control means instructs said input/output means to perform error correction on the basis of data read out from each of the other disk controllers.

4. The disk array apparatus according to claim 3, wherein when the control means is requested by the host apparatus to read out data from said first region and constancy is more important than quality, or when the control means is requested by the host apparatus to read out data from the second region, the control means instructs each disk controller to read out data from the first region or the second region of each disk drive of the first disk array group or a target first disk array group, and
    when a read error has occurred in only one of the disk controllers, the control means instructs said input/output means to perform error correction on the basis of data read out from each of the other disk controllers.

5. The disk array apparatus according to claim 2, wherein when the control means is requested by the host apparatus to write data in said first region, the control means instructs the input/output means to generate the first-type parity of write data supplied from the host apparatus and instructs each disk controller to write divided data of the write data or the first-type parity data generated by the input/output means into the first region of each disk drive of a target one of the first disk array groups, and the control means instructs the input/output means to generate the second-type parity data on the basis of data of the corresponding first regions of the disk drives of each of the second disk array groups, to which the associated disk drives belong, and write the generated second-type parity data into the first regions of the corresponding disk drives.

6. The disk array apparatus according to claim 2, wherein said first and second regions are arranged on the disk region of the disk drive radially outward of the third region.

7. The disk array apparatus according to claim 2, wherein when the control means is requested by the host apparatus to read out data from said third region, the control means performs a scheduling process, wherein the control means instructs the disk controller corresponding to the disk drive designated by the host apparatus to perform a data read-out in a mode without recovery by a second system for reading out data from the third region of the designated disk drive, when a read error has occurred, the control means instructs the disk controller to read out data from the corresponding third regions of the disk drives of the second disk array group to which the designated disk drive belongs and to perform a data read-out in a recovery mode by the second system for performing error correction based on the read-out data, and when error correction is impossible due to the read error, the control means instructs the disk controller to perform performing a data read-out in a mode with recovery by the second system for performing data read-out from the designated disk drive of the second disk array group to which the designated disk drive belongs and error correction based on data read out from the third region of each of the other disk drives of the second disk array group to which the designated disk drive belongs at the time of the read error.

8. The disk array apparatus according to claim 2, wherein when the control means is requested by the host apparatus to read out data from said first region, the control means instructs each disk controller to perform a data read-out in a mode without recovery by a second system for performing only data read-out from the first region of each disk drive of the first disk array group which is the target disk array group, when a read error has occurred in only one of the disk controllers, the control means instructs said input/output means to perform error correction on the basis of data read out from each of the other disk controllers, when read errors have occurred in two or more of the disk controllers, the control means instructs the disk controllers with the read errors to read out data from the first regions of the associated disk drives of the corresponding second disk array group, in case of a read error, the control means performs a data read-out in a mode with recovery by the second system for reading out data from the corresponding first region of each of the other disk drives of the second disk array group and performing error correction based on the read-out data, and when error correction is unfeasible in only one of the disk controllers, the control means instructs the input/output means to perform error correction based on data read out from the other disk controllers.

9. The disk array apparatus according to claim 8, wherein said control means has a first queue for each of the first disk array groups, the first queue representing I/O requests for said first region and I/O requests for said second region, and a second queue for each of the second disk array groups, the second queue representing read-out requests for the first region in the mode with recovery by the second system and parity generation/write requests by the second system for generating the second-type parity data based on data of the first region of each disk drive of the second disk array group and writing the generated second-type parity data in the first regions of the corresponding disk drives, when the control means is requested by the host apparatus to write data in said first region, the control means instructs the input/output means to generate the first-type parity data of write data supplied from the host apparatus, and connects, to the first queue corresponding to the first disk array group, I/O requests for instructing each disk controller to write divided data of said write data or the first-type parity data generated by the input/output means into the first region of each disk drive of the first disk array group which is the target disk array group, if data write represented by the I/O request connected to the first queue has normally been completed, the control means connects, to the second queue corresponding to the second disk array group, a parity generation/write request by the second system for the second disk array group, for each of the second disk array groups to which the disk drives of the first disk array group belong, and informs the host apparatus of normal completion of data write.

10. The disk array apparatus according to claim 9, wherein the control means connects the parity generation/write request by the second system to such a side of the same second queue that the parity generation/write request is executed earlier than any one of the read-out requests in the mode with recovery by the second method.

11. The disk array apparatus according to claim 10, wherein the control means further includes a third queue for each second disk array group, the third queue representing I/O requests for the third region, the control means further comprises first time storage means for storing a first time calculated by adding an allowance time to a time required for executing the requests connected to the first queue; second time storage means for storing a second time greater than the first time and than an upper limit value of a time required for executing each request connected to the second queue and the third queue; and third time storage means for storing a third time calculated by accumulating a difference between the first time and a time required to actually execute the request, when a transfer length of the input/output request for the first or second region, which is to be connected to the first queue, is greater than a predetermined length, the input/output request is divided into a plurality of input/output requests each having a transfer length less than said predetermined length, and the divided input/output requests are connected to the first queue, an upper limit value of a necessary request execution time, which is needed in the state in which there is no interference between requests, is set in each of the requests connected to the second queue and the third queue, the input/output requests are normally scheduled such that the requests connected to the first queue have top priority and the first disk array groups do not overlap, those of the requests connected to the second and third queues, in which the upper limit values less than the first time are set, are scheduled, when at least one of the requests has been scheduled, the control means stores in the third storage means a new third time obtained by adding the first time to the third time, and controls the execution of the scheduled request, and stores in the third time storage means a new third time obtained by subtracting a passage time until completion of the execution from said third time, when none of the requests has been scheduled, the control means stores the second time in the third time storage means as the third time, when the third time becomes greater than the second time, the control means schedules only those of the requests which are connected to the second queue and third queue, when at least one of the requests has been scheduled, the control means controls the execution of the scheduled request, and when none of the requests has been scheduled after the execution of the request was completed, the control means immediately stores initial value "0" in the third time storage means.

* * * * *